United States Patent
Okazaki et al.

(10) Patent No.: US 6,411,411 B1
(45) Date of Patent: Jun. 25, 2002

(54) OPTICAL WAVELENGTH SELECTIVE CONTROL APPARATUS

(75) Inventors: Kazue Okazaki; Terumi Chikama, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/186,151

(22) Filed: Nov. 5, 1998

(30) Foreign Application Priority Data

Mar. 20, 1998 (JP) .......................................... 10-072810

(51) Int. Cl.[7] .............................................. H04J 14/02
(52) U.S. Cl. ...................... 359/127; 359/193; 359/578; 359/589; 359/634
(58) Field of Search ................................ 359/127, 193, 359/578, 589, 634

(56) References Cited

U.S. PATENT DOCUMENTS

| | | | | |
|---|---|---|---|---|
| 5,396,359 A | * | 3/1995 | Abramovitz | 359/127 |
| 5,469,288 A | * | 11/1995 | Onaka et al. | 359/189 |
| 5,781,332 A | * | 7/1998 | Ogata | 359/308 |
| 6,034,800 A | * | 3/2000 | Asahi | 359/128 |
| 6,043,922 A | * | 3/2000 | Koga et al. | 359/193 |

FOREIGN PATENT DOCUMENTS

| | | | | |
|---|---|---|---|---|
| JP | 07199252 A | * | 4/1995 | 359/127 |
| JP | 7-199252 | | 8/1996 | |

* cited by examiner

*Primary Examiner*—Leslie Pascal
*Assistant Examiner*—Hanh Phan
(74) *Attorney, Agent, or Firm*—Staas & Halsey LLP

(57) ABSTRACT

An optical wavelength selective control apparatus has a plurality of wavelength selective optical filters connected to one another to extract an optical signal at an arbitrary wavelength from wavelength division multiplexed signals according to a frequency signal for selecting a wavelength, and a frequency oscillator for outputting a signal at a frequency corresponding to a wavelength of the optical signal to be extracted to each of the wavelength selective optical filters as a frequency signal for selecting a wavelength, thereby performing a wavelength selecting process highly accurately with the wavelength selective optical filter.

58 Claims, 14 Drawing Sheets

IN THE CASE WHERE LIGHTS AT THE SAME WAVELENGTH ARE TRANSMITTED [A SPECIFIC WAVELENGTH (λK) IS ELIMINATED] BY TWO AOTFS

OPTICAL WAVELENGTH SELECTIVE CONTROL APPARATUS

BACKGROUND OF THE INVENTION (1) Field of the Invention

The present invention relates to an optical wavelength selective control apparatus for selecting arbitrary optical signals from wavelength-division-multiplexed optical signals and performing optical transmission.

(2) Description of the Related Art

As well known, wavelength-division-multiplexing (WDM) transmission system using band characteristics of an optical fiber is expected as a transmission system which can increase a transmission capacity or can configure an optical network whose flexibility has been improved because it is easy to drop/add a signal.

In concrete, the WDM transmission system wavelength-division-multiplexes plural optical signals at different wavelengths and transmits them over one optical fiber. Therefore, if multiplexing signals at the same transmission rate, the WDM transmission system can transmit a larger quantity of information by the number of times of wavelength-division-multiplexing than a transmission system which modulates, at a high speed, optical signals at one kind of wavelength and transmits them over one optical fiber. Even with respect to low-speed optical signals, the WDM transmission system can obtain the same transmission capacity as a transmission system which transmits high-speed optical signals at one wavelength, by wavelength-division-multiplexing the low-speed optical signals.

In the above WDM transmission system, wavelengths of transmitted optical signals are required to be spaced to one another to a degree that a signal is not affected by a signal at a neighboring wavelength. There is an optical amplifier having a band larger than ten-odd nanometers, at present. It is therefore possible to realize a WDM transmission system in which the above wavelengths are spaced approximately one nanometer, and such system is being introduced as a real system.

A lot of researches are conducted on optical networks based on the above WDM transmission system in these years. As an example, there is a network having an ADM (Add-Drop Multiplex) function of not only transmitting WDM signals from one point to another point, but also selectively transmitting only an optical signal at a specific wavelength among multiplexed optical signals at a repeating point called a node provided in the course of a transmission line, or receiving signals at other wavelengths at the node, or adding a light of another signal at the node and transmitting the signal to another node. The ADM function is a technique having a feature that can drop/add a signal as in a state of light at will, which is characteristic of the WDM transmission technique.

As an important device for the above WDM transmission system, there is a wavelength division selective optical filter (hereinafter called merely an optical filter, occasionally). For example, there is used the optical filter on the receiving side of the WDM transmission system in order to split wavelength multiplexed optical signals (WDM signals) by wavelength and receive it. The wavelength division selective optical filter in this case eliminates unnecessary signals (other signals) other than a transmitted optical signal, and eliminates noises generated by an optical amplifier provided along the transmission line, at the same time. For this reason, the optical filter is generally required that a transmission band for each wavelength is narrow as much as possible in order to suppress other signals or noises, or a wavelength to be selected is variable in order to select a signal at an arbitrary wavelength.

Such wavelength-selective optical filter is also used as, for example, an optical ADM node or an optical crossconnect apparatus (not shown) in an optical network. Since the optical ADM node needs a function of transmitting (adding) an optical signal at an arbitrary wavelength and receiving (dropping) an optical signal at an arbitrary wavelength, the optical filter is used on both the adding and dropping sides, where a wavelength to be selected is required to be variable.

In the optical crossconnect apparatus, the optical filter is used in a portion where an optical signal is converted from one wavelength to another wavelength. In order to transmit an electric signal with a light at an arbitrary wavelength, the optical filter selects only a light at a desired wavelength among transmittable N-wavelength-multiplexed CW (Continuous Wave) lights, and applies a transmit signal thereto.

As the wavelength selecting optical filter, there is an optical filter (AOTF: Acousto-Optic Tunable Filter) using the acoustooptic effect, for example.

FIG. 14 is a block diagram showing a structure of the AOTF. An AOTF 50 shown in FIG. 14 has a light input port 50a, an optical waveguide 501, polarization beam splitters (PBSs) 502 and 507, SAW absorbers 503 and 506, a finger electrode (IDT) 504, an SAW cladding (Ti-deeply-diffused region) 505 and light output ports 50b and 50c. In the AOTF 50, an optical signal propagated through the optical waveguide 501 interferes with a surface acoustic wave propagated through the SAW cladding 505 so that only a light at a part of wavelengths undergoes polarization-conversion. The splitter (PBS 507) splits only the polarization-converted light to take out (select) a part of the wavelengths.

In concrete, an RF signal corresponding to a light at a wavelength to be taken out is applied to the IDT 504 (electrode logarithm N, opening length W) to generate a surface acoustic wave (SAW) which applies polarization-conversion to only a light at a wavelength to be taken out, and the surface acoustic wave is propagated through the SAW cladding 505. At this time, a microwave is generated from the IDT 504 toward the both sides of the SAW cladding 505, which might affect a polarization-splitting process in the PBSs 502 and 507. However, the microwave is absorbed by the SAW absorbers 503 and 506.

When an optical signal is inputted from the input port 50a in this state, the optical signal is polarization-split by the PBS 502, and propagated as an optical signal in a TE mode and an optical signal in a TM mode through the optical waveguides 501a and 501b.

Each of these signals interferes with the above surface acoustic wave propagated through the SAW cladding 505, whereby only an optical signal at a wavelength which is desired to be taken out is polarization-converted (TE-TM mode conversion). The optical signal so polarization-converted is polarization-split at the PBS 507 so that only an optical signal (selected optical signal) at a wavelength desired to be taken out is outputted from the light output port 50c. Optical signals having not been selected are outputted from the other light output port 50b.

Here, if a temperature of the AOTF 50 (device) is constant in the wavelength selecting process at the AOTF 50, a relation between a frequency of the above surface acoustic wave and a frequency of the selected optical signal is 1:1.

Accordingly, in the AOTF 50, when a frequency of the RF signal supplied to the IDT 504 is varied, the selected optical wavelength is varied. As this, a wavelength variable selective optical filter is realized with AOTF 50.

When a plurality of RF signals at different frequencies are mixed and supplied to the IDT 504, the AOTF 50 can select a plurality of light wavelengths corresponding to frequencies of the RF signals at a time. Namely, the AOTF 50 is very effective as an ADM (multiple wavelength selective optical) filter which can select not only one wave but also a plurality of optical signals at desired wavelengths simultaneously.

Hereinafter, description will be made of an actual system to which the AOTF 50 is applied.

FIG. 12 is a block diagram showing an example of a structure of a WDM transmission system. In a WDM transmission system 600A shown in FIG. 12, unnecessary components such as sidebands and the like of optical signals at different wavelengths generated by light sources (LDs) 610-1 through 610-n are eliminated by band-pass filters (BPF) 613'-1 through 613'-n (n is a natural number) in a sending system 61'. The optical signals are modulated by respective modulators (MOD) 61c-1 through 61c-n, multiplexed by a multiplexing coupler 61d, and transmitted to a receiving system 62'. Incidentally, the above BPFs 613'-1 through 613'-n also serve to eliminate an effect on other channels when wavelength variation occurs in the light sources 610-1 through 610-n.

In a receiving system 62', a demultiplexing coupler 62d demultiplexes the optical signals from the sending system 61', AOTFs 62a-1 through 62a-n having the same structures as the above AOTF 50 select respective optical signals at one wave, and each of receiving units 62b-1 through 62b-n receives an optical signal at a desired wavelength.

In the WDM transmission system 600A, the sending system 61' and the receiving system 62' have a transmit light source redundant unit 64 and a receiving unit redundant unit 65, respectively, functioning as a standby at the time of fault of a transmitting function or a receiving function corresponding to a certain wavelength, as shown in FIG. 12.

In concrete, the transmit light source redundant unit 64 has a tunable light source (T-LD) 610A of an output optical wavelength tunable type, an AOTF 613A similar to the above AOTF 50 and a modulating unit (MOD) 61c'. When a fault develops in any one of sending functions for respective wavelengths accomplished by respective combinations of the LDs 610-1 through 610-n, BPFs 613'-1 through 613'-n and MODs 61c-1 through 61c-n, an output wavelength of the tunable light source 610A and a selected wavelength of the AOTF 613A are switched to a wavelength at which the fault occurs so as to function in lieu of the portion in which the fault occurs.

The receiving unit redundant unit 65 has an AOTF 62A similar to the above AOTF 50 and a receiving unit 62B similar to the above receiving units 62b-1 through 62b-n. When a fault occurs in any one of receiving functions for respective wavelengths accomplished by respective combinations of the AOTFs 62a-1 through 62a-n and the receiving units 62b-1 through 62b-n, a selected wavelength of the AOTF 62A is switched to a wavelength at which the fault occurs so as to function in lieu of a portion in which the fault occurs, similarly to the above transmit light source redundant unit 64.

In the above WDM transmit system 600A, the sending system 61' and the receiving system 62' are provided with respective standbys using selected-wavelength alterable AOTFs, whereby reliability of the system is improved.

FIG. 13 is a block diagram showing an example of a structure of an optical ADM node. An optical ADM node 600 shown in FIG. 13 has an optical ADM unit 60, a sending system 61, a receiving system 62 and an optical amplifier 63.

The optical ADM unit 60 performs a dropping/adding process on transmit optical signals, which has an AOTF 60a similar to the above AOTF 50 as a wavelength selective optical filter for dropping an optical signal. Incidentally, the AOTF 60a can select optical signals at a plurality of wavelengths (select multiple wavelengths) according to frequencies of RF signals ($f_1, f_2, \ldots f_x$; $x \leq n$) for selecting respective wavelengths.

The sending system 61 transmits optical signals at arbitrary wavelengths among transmittable N waves (N is a natural number) to the optical ADM unit 60 in order to add the optical signals to inputted optical signals to the optical ADM unit 60, which has, for example, a wavelength division multiplexed signal distributing light source 61a, gate switches 61b-1 through 61b-n (n is a natural number), modulators (MOD) 61c-1 through 61c-n, a multiplexing coupler 61d and an optical amplifier 61e.

The wavelength division multiplexed signal distributing light source 61a generates and outputs optical signals at wavelengths to be added to inputted optical signals at the optical ADM unit 60. For this purpose, the wavelength division multiplexed signal distributing light source 61a has light sources (LDs) 610-1 through 610-n for outputting lights (signals) at different wavelengths $\lambda_1$ through $\lambda_n$, a multiplexing coupler 611 for multiplexing lights at respective wavelengths $\lambda_1$ through $\lambda_n$ outputted from the LDs 610-1 through 610-n, a demultiplexing coupler 612 for demultiplexing the optical lights multiplexed by the multiplexing coupler 611 into n wavelengths $\lambda_1$ through 80 $_n$, AOTFs 613-1 through 613-n each for allowing a light at only a corresponding wavelength ($\lambda_1, \lambda_2, \lambda_3, \ldots$ or $\lambda_n$) among optical outputs demultiplexed by the demultiplexing coupler 612 to pass therethrough, and a wavelength stabilizing circuit 614. Incidentally, each of the above AOTFs 613-1 through 613-n is similar to the above AOTF 50, which is used as an optical filter for selecting one wave.

The sending system 61 can select and transmit an arbitrary number of optical signals at aribitrary wavelengths among transmittable N waves, by using the AOTFs 613-1 through 613-n.

The wavelength stabilizing circuit 614 monitors optical outputs demultiplexed by the above demultiplexing coupler 612, adjusts minute deviations or the like of the optical wavelengths outputted from the LDs 610-1 through 610-n, thereby stabilizing the wavelengths $\lambda_1$ through $\lambda_n$ of the transmit optical signals.

As shown in FIG. 13, each of the gate switches 61b-1 through 61b-n is switched according to whether an optical signal at a wavelength $\lambda_1, \lambda_2, \lambda_3, \ldots$ or $\lambda_n$ is newly added at the optical ADM unit 60 to a vacant wavelength resulted from that the optical signal at the corresponding wavelength $\lambda_1, \lambda_2, \lambda_3, \ldots$ or $\lambda_n$ dropped at the AOTF 613-1, 613-2, . . . or 613-n, which are connected in series (cascade) to one another, is received by the receiving unit 62b-1, 62b-2, . . . or 62b-x ($x \leq n$) to be described later. The modulators 61c-1 through 61c-n modulate optical signals having passed through the gate switches 61b-1 through 61b-n. The multiplexing coupler 61d multiplexes the optical signals modulated by the modulators 61c-1 through 61c-n. The optical amplifier 61e amplifies the optical signals multiplexed by the multiplexing coupler 61d.

The receiving system 62 shown in FIG. 13 receives optical signals selected (dropped) by the optical ADM unit 60, which has AOTFs 62a-1 through 62a-x (x<n) and receiving units 62b-1 through 62b-x. Each of AOTFs 62a-1 through 62a-x used here is similar to the above AOTF 50. In this case, each of the AOTFs 62a-1 through 62a-x is served as an optical filter for selecting an optical signal at one wavelength by being applied thereto an RF signal at one frequency.

Each of the receiving units 62b-1 through 62b-x receives an optical signal at a predetermined wavelength ($\lambda_1$, $\lambda_2$, $\lambda_3$, ... or $\lambda_x$) dropped by the corresponding AOTF 62a-1, 62a-2, ... or 62a-x.

In the case where WDM optical signals at wavelengths $\lambda_1$ through $\lambda_8$ are inputted to the optical ADM unit 60 and WDM optical signals at wavelengths $\lambda_1$ through $\lambda_4$ are selected in the AOTF 60a, the four AOTFs 62a-1 through 62a-4 select the wavelength $\lambda_1$ through $\lambda_4$ of the WDM optical signals and separate by wavelength to receive them in the receiving system 62.

Namely, the AOTF 62a-1 selects only an optical signal at a wavelength $\lambda_1$ corresponding to an RF signal at a frequency $f_1$ among the WDM optical signals at wavelengths $\lambda_1$ through $\lambda_4$, and the receiving unit 62b-1 receives the selected optical signal. The AOTF 62a-2 selects an optical signal at a wavelength $\lambda_2$ corresponding to an RF signal at a frequency $f_2$ among the WDM optical signals at wavelengths $\lambda_2$ through $\lambda_4$ having not been selected in the AOTF 62a-1, and the receiving unit 62b-2 receives the selected optical signal. The other AOTFs 62a-3 and 62a-4 select optical signals at wavelengths $\lambda_3$ and $\lambda_4$ corresponding to RF signals at frequencies $f_3$ and $f_4$, respectively, and the receiving units 62b-3 and 62b-4 receive the respective selected optical signals.

The optical amplifier 63 shown in FIG. 13 amplifies optical signals having not been selected by the optical ADM unit 60 (that is, optical signals to be transmitted to the next system) such that the optical signals can be transmitted for a predetermined transmission distance.

As stated above, the optical ADM node 600 can drop optical signals at arbitrary wavelengths from transmitted optical signals (WDM signals) at a plurality of wavelengths by the optical ADM unit 60 to receive them, or add optical signals at arbitrary vacant wavelengths to transmit them.

When the above receiving system 62 or 62' (refer to FIG. 13 or 12) switches such that the AOTF 62a-1 drops (selects) first an optical signal at a wavelength $\lambda_1$, after that, drops an optical signal at a wavelength $\lambda_5$, a frequency of an RF signal to be supplied to the AOTF 62a-1 is switched from a value ($f_1$) corresponding to the wavelength $\lambda_1$ to a value ($f_5$) corresponding to the wavelength $\lambda_5$.

However, a frequency of the RF signal changes continuously from $f_1$ to $f_5$, so that a wavelength selected by the AOTF 62a-1 changes continuously with a change of the frequency. For this, the receiving unit 62b-1 receives optical signals at wavelengths $\lambda_2$, $\lambda_3$, $\lambda_4$, etc., other than the wavelength $\lambda_5$ until receiving the optical signal at a wavelength $\lambda_5$ that should be received. Therefore, it is quite inappropriate to switch a wavelength of a received signal while the system is operated.

Since the above optical ADM node 600 or an optical crossconnect apparatus, in particular, multiplexes optical signals at a plurality of wavelengths and transmits them after performing the above wavelength selecting process, if an optical signal at another wavelength $\lambda_2$, $\lambda_3$ or $\lambda_4$ is transmitted even in a moment when a selected wavelength is switched from $\lambda_1$ to $\lambda_5$ as above, an optical signal at the same wavelength as another optical signal at a wavelength other than a wavelength to be selected might leak. This affects an optical signal at another wavelength as coherent crosstalk, leading to degradation of the transmission characteristic.

For the purpose of solving the above problem, there has been proposed a technique disclosed in Japanese Patent Laid-Open Publication Number 7-199252.

FIG. 15 is a block diagram showing an example of an optical wavelength selective control apparatus for the purpose of explaining the above technique. An optical wavelength selective control apparatus 100 shown in FIG. 15 has an AOTF 50, an RF oscillator 51 and a control unit 52.

The AOTF 50 is similar to that described before with reference to FIG. 10. The RF oscillator 51 outputs an RF signal at a frequency corresponding to a wavelength of an optical signal to be selected to the above AOFT 50. According to this technique, a frequency and an amplitude of an outputted RF signal are controlled according to control signals (frequency control signal, amplitude control signal) from the control unit 52.

The control unit 52 controls a frequency and an amplitude of the RF signal oscillated by the RF oscillator 51. When altering an optical signal at a wavelength to be selected, the control unit 52 outputs an amplitude control signal to suppress an amplitude of the RF signal of the RF oscillator 51 to zero or sufficiently small, after that, outputs a frequency control signal to switch to a predetermined frequency, and stops an output of the above amplitude control signal, thereby recovering the above amplitude.

In order to prevent an optical signal at another wavelength from being selected while a frequency of the RF signal is altered, it is possible that a switch (SW) 53 is provided on the outputting side of the above RF oscillator 51 as indicated by a broken line in FIG. 15, and the control unit 52 controls the switch 53 to turn it OFF when the RF signal outputted from the RF oscillator 51 is altered to another RF signal.

With the above structure, the optical wavelength selective control apparatus 100 makes an amplitude of the RF signal to be supplied to the AOTF 50 sufficiently small when altering a wavelength to be selected by the AOFT 50, then changes an oscillation frequency of the RF oscillator 51 to a frequency corresponding to the wavelength to be selected. Namely, while altering a frequency of the RF signal to the AOTF 50, the optical wavelength selective control apparatus 100 controls an amplitude of the RF signal in order to prevent the AOTF 50 from selecting a signal other than a signal to be selected.

Even if an amplitude of the RF signal to be supplied to the AOTF 50 is suppressed to zero or sufficiently small, or an output of the RF signal is stopped using the switch 53, as above, there is a possibility that another signal is allowed to be transmitted when an extinction ratio of the AOTF 50 is insufficient. The WDM transmission requires approximately 20 to 25 dB as an extinction ratio of the AOTF 50, for example. However, the actual circumstances is that 20 dB is not realized at present. For this reason, there is a good chance of occurrence of the above phenomenon.

If the AOTF 50 is used in an optical network, an insufficient extinction ratio might affect transmission characteristic as coherent crosstalk, leading to degradation of the transmission characteristic. To suppress the affect, at least 45 dB or so is required as an extinction ratio.

SUMMARY OF THE INVENTION

In the light of the above problem, an object of the present invention is to provide an optical wavelength selective control apparatus which can select (extract) optical signals at arbitrary wavelengths highly accurately by cascading wavelength selective optical filters so as to largely improve an extinction ratio in a wavelength selecting process, and avoid an effect on optical signals at wavelengths not selected when altering a plurality of wavelengths of optical signals to be extracted to other optical signals.

The present invention therefore provides an optical wavelength selective control apparatus comprising a plurality of wavelength selective optical filters each for extracting an optical signal at an arbitrary wavelength from wavelength-division-multiplexed optical signals obtained by wavelength-division-multiplexing optical signals at a plurality of wavelengths according to a frequency signal for selecting a wavelength, the wavelength selecting optical filters being connected to one another to form a cascade, and a frequency oscillator for outputting a signal at a frequency corresponding to the wavelength of the optical signal to be extracted in each of the wavelength selective optical filters as the frequency signal for selecting a wavelength.

The optical wavelength selective control apparatus according to this invention can perform a wavelength selecting process on optical signals at the same wavelength plural times so that a quality of the selected optical signal is largely improved.

The optical wavelength selective control apparatus according to this invention may further have a control unit for controlling a frequency of the frequency signal outputted from the frequency oscillator, and a first stopping unit interposed between the frequency oscillator and a wavelength selective optical filters to be able to stop an output of the frequency signal from the frequency oscillator, wherein the control unit controls the first stopping unit to stop an output of the frequency signal while the control unit alters a frequency of the frequency signal outputted from the frequency oscillator.

According to this invention, since an output of the frequency signal to the wavelength selective optical filters is stopped while a frequency of the frequency signal outputted from the frequency oscillator is altered, it is possible to prevent other wavelengths than wavelengths to be extracted from being selected even when an oscillation frequency of the frequency oscillator is continuously altered, thus further improve accuracy of the wavelength selecting process.

In the optical wavelength selective control apparatus of this invention, the plurality of wavelength selective optical filters may have the same temperature characteristics respectively and be configured as one common module, and the control unit may control the frequency oscillator according to a change in temperature of the common module to be able to adjust a frequency of the frequency signal.

Alternatively, the plurality of wavelength selective optical filters may have different temperature characteristic and be configured as one common module, and a plural number of the frequency oscillators and the first stopping units may be provided correspondingly to the plurality of wavelength selective optical filters, wherein the control unit controls each of the first stopping units and controls each of the frequency oscillators according to a change in temperature of the common module and the temperature characteristics of each of the wavelength selective optical filters to adjust a frequency of each frequency signal.

Still alternatively, the plurality of wavelength selective optical filters may be configured as individual modules, and a plural number of the frequency oscillators and the first stopping units may be provided correspondingly to the plurality of wavelength selective optical filters, wherein the control unit controls each of the first stopping units and controls each of the frequency oscillators according to a change in temperature of each of the individual modules to adjust a frequency of each frequency signal.

It is possible to output a high-accurate frequency signal from the frequency oscillator at all times since a frequency of the frequency signal from each of the frequency oscillator is adjusted according to a change in temperature of a module (wavelength selecting unit) having the wavelength selecting optical filter. As a result, accuracy of the wavelength selecting process in each of the wavelength selective optical filters may be further improved.

Still alternatively, the plurality of wavelength selective optical filters may have the same temperature characteristics and be configured as a common module, and the control unit may control a temperature of the common module such that a temperature of the common module is a predetermined temperature.

Further, the plurality of wavelength selective optical filters may have different temperature characteristics and be configured as one common module, and a plural number of the frequency oscillators and the first stopping units may be provided correspondingly to the plurality of wavelength selective optical filters, wherein the control unit controls each of the first stopping units, controls a temperature of the common module so that a temperature of the common module is a predetermined temperature, and controls each of the frequency oscillators according to the temperature characteristics of each of the wavelength selective optical filters to adjust a frequency of each frequency signal.

Alternatively, the plurality of wavelength selective optical filters may have different temperature characteristics and be configured as individual modules, and the control unit may control a temperature of each of the individual modules so that a temperature of each of the individual modules is a predetermined temperature.

Since the control unit controls a temperature of each of the wavelength selective optical filters (wavelength selecting unit) so that a temperature of the module (wavelength selecting unit) having the wavelength selective optical filters is a predetermined temperature, the wavelength selective filter can thereby perform the wavelength selecting process under a stable temperature condition at all times, which further improves accuracy of the wavelength selecting process in the wavelength selective optical filter (wavelength selecting unit).

The first stopping unit may be configured as a switch being able to stop an output of the frequency signal from the frequency oscillator, or an amplifier being able to stop an output of the frequency signal by adjusting an amplification factor for the frequency signal from the frequency oscillator.

It is therefore possible to realize a function of stopping an output of the frequency signal to the wavelength selective optical filters while the above frequency is altered, with an extremely simplified structure.

Alternatively, the optical wavelength selective control apparatus described in claim 1 according to this invention may have a control unit for controlling a frequency of the frequency signal outputted from the frequency oscillator, and a second stopping units each disposed on the outputting side of a corresponding wavelength selective optical filter to be able to stop an output of an optical signal extracted by the wavelength selective optical filter, wherein the control unit controls the second stopping units to stop outputs of the wavelength selective optical filters while the control unit alters a frequency of the frequency signal outputted from the frequency oscillator.

It is thereby possible to stop outputs of optical signals extracted in the wavelength selective optical filters while a frequency of the frequency signal outputted from the frequency oscillator is altered so that transmission of optical signals at wavelengths not selected is certainly prevented, thus an optical signal at a wavelength to be extracted is extracted highly accurately.

Each of the wavelength selective optical filters may be configured with an acouto-optical tunable filter. In which case, it is possible to realize the above-mentioned wavelength extracting function quite easily.

The present invention further provides an optical wavelength selective control apparatus comprising a wavelength selecting unit for extracting optical signals at a maximum of m (m is a natural number satisfying 1<m<N) wavelengths from wavelength-division-multiplexed optical signals obtained by wavelength-division-multiplexing optical signals at N (N is a natural number not less than 2) wavelengths according to frequency signals for selecting wavelengths, m frequency oscillators for outputting signals at frequencies corresponding to wavelengths of the optical signals to be extracted in the wavelength selecting unit as the frequency signals for selecting wavelengths, a control unit for controlling each of frequencies of the frequency signals outputted from the frequency oscillators, and m stopping units each being able to stop an output of the frequency signal from a corresponding frequency oscillator, wherein the control unit controls each of the stopping units to stop an output of the frequency signal while the control unit alters frequencies of the frequency signals outputted from the frequency oscillators.

The above apparatus stops outputs of the frequency signals to the wavelength selecting unit by the stopping units when altering selected wavelengths, then alters frequencies from the frequency oscillators that are targets in the frequency alteration to desired values, so that another optical signal not selected does not leak as a selected optical signal when selected wavelengths are altered. Therefore, it is possible to extract optical signals at wavelengths to be extracted highly accurately, thus improve a performance of the wavelength-division-multiplexing optical transmission system. In this case, a required number of the oscillators (m) is less than the number of times of multiplexing (N) of the wavelength-division-multiplexed optical signal, which simplifies a structure of the apparatus.

The wavelength selecting unit may be configured as a wavelength selective optical filter for extracting optical signals at arbitrary m wavelengths from the wavelength multiplexed optical signals obtained by multiplexing N wavelengths according to frequency signals from the m frequency oscillators. In which case, it is possible to realize an m-wavelength selecting function with an extremely simple structure.

The wavelength selecting unit may have a plurality of wavelength selective optical filters each for extracting optical signals at arbitrary m wavelengths from the wavelength-division-multiplexed optical signals according to the frequency optical signals from the m frequency oscillators, wherein the wavelength selective optical filters are connected to one another to form a cascade.

In this case, it is possible to perform the wavelength selecting process on optical signals at the same wavelength plural times so that a quality of the selected optical signal is largely improved.

In this case, if the wavelength selective optical filter is configured with an acousto-optic tunable filter, it is possible to realize the above wavelength selecting function quite readily.

The control unit may control the frequency oscillators according to a change in temperature of the wavelength selecting unit so as to adjust frequencies of frequency signals.

Accordingly, it is possible to output high-accurate frequency signals at all times from the frequency oscillators, which further improves accuracy of the wavelength selecting process in the wavelength selecting unit.

Further, the control unit may control a temperature of the wavelength selecting unit such that a temperature of the wavelength selecting unit is a predetermined temperature.

The wavelength selecting unit can thereby perform the wavelength selecting process under a stable temperature condition at all times so that it is unnecessary to finely adjust an oscillation frequency of the frequency oscillator, as above.

Each of the stopping units may be configured as a switch controlled by the control unit to be turned OFF to be able to stop an output of the frequency signal from a corresponding frequency oscillator, or as an amplifier being able to stop an output of the frequency signal by adjusting an amplification factor of the frequency signal from a corresponding frequency oscillator by the control unit.

It is therefore possible to realize a function of stopping an output of the frequency signal to the wavelength selecting unit while the selected wavelength is altered, with an extremely simple structure.

The present invention still further provides an optical wavelength selective control apparatus comprising a wavelength selecting unit for extracting optical signals at arbitrary m (m is a natural number satisfying 1<m≦N) wavelengths from wavelength-division-multiplexed optical signals obtained by wavelength-division-multiplexing optical signals at N (N is a natural number not less than 2) wavelengths according to frequency signals for selecting wavelengths, N frequency oscillators for outputting signals at frequencies corresponding to wavelengths of the optical signals to be extracted in the wavelength selecting unit as the frequency signals for selecting wavelengths, N stopping units each for stopping an output of the frequency signal from a corresponding frequency oscillator, and a control unit for controlling relevant stopping units to transmit outputs of the frequency signals corresponding to wavelengths that are targets in alteration, while controlling relevant stopping units to stop outputs of the frequency signals other than the frequency signals corresponding to the wavelengths that are targets in alteration to when altering wavelengths of optical signals to be selected in the wavelength selecting unit.

Therefore, it is possible to alter selected wavelengths in the wavelength selecting unit only by controlling each of the stopping units be turned ON/OFF, so that accuracy of optical signals at wavelengths to be extracted may be improved and the wavelength selecting process may be performed quickly.

The wavelength selecting unit may be configured as a wavelength selective optical filter for extracting optical signals at arbitrary N wavelengths from the wavelength-division-multiplexed optical signals according to the frequency signals from the N frequency oscillators. In which case, it is possible to accomplish the above wavelength selecting function with an extremely simple structure.

Alternatively, the wavelength selecting unit may have a plurality of wavelength selective optical filters each for extracting optical signals at arbitrary m wavelengths from the wavelength-division-multiplexed optical signals according to the frequency signals from m frequency oscillators among the N frequency oscillators, wherein the wavelength selective optical filters are connected to one another to form a cascade.

In this case, it is possible to perform the wavelength selecting process on optical signals at the same wavelength plural times so that a quality of selected optical signals is largely improved.

The wavelength selective optical filter may be configured with an acousto-optic tunable filter. In which case, the above-mentioned wavelength selecting function may be accomplished quite readily.

The control unit may control the frequency oscillators according to a change in temperature of the wavelength selecting unit to adjust frequencies of the frequency signals.

It is thereby possible to output high-accurate frequency signals from the frequency oscillators at all times, thus further improve accuracy of the wavelength selecting process in the wavelength selecting unit.

The control unit may control a temperature of the wavelength selecting unit such that a temperature of the wavelength selecting unit is a predetermined temperature.

It is thereby possible to perform the wavelength selecting process in the wavelength selecting unit under a stable temperature condition at all times so that accuracy of the wavelength selecting process in the wavelength selective optical filter (wavelength selecting unit) is further improved.

Each of the stopping units may be configured as a switch controlled by the control unit to be turned OFF to be able to stop an output of the frequency signal from a corresponding frequency oscillator, or an amplifier being able to stop an output of the frequency signal by adjusting an amplification factor for the frequency signal from a corresponding frequency oscillator by the control unit. In which case, it is possible to stop outputs of the frequency signals for optical signals not selected to the wavelength selecting unit while selected wavelengths are altered, with an extremely simple structure.

DESCRIPTION OF THE PREFERRED EMBODIMENTS

Figure 1:
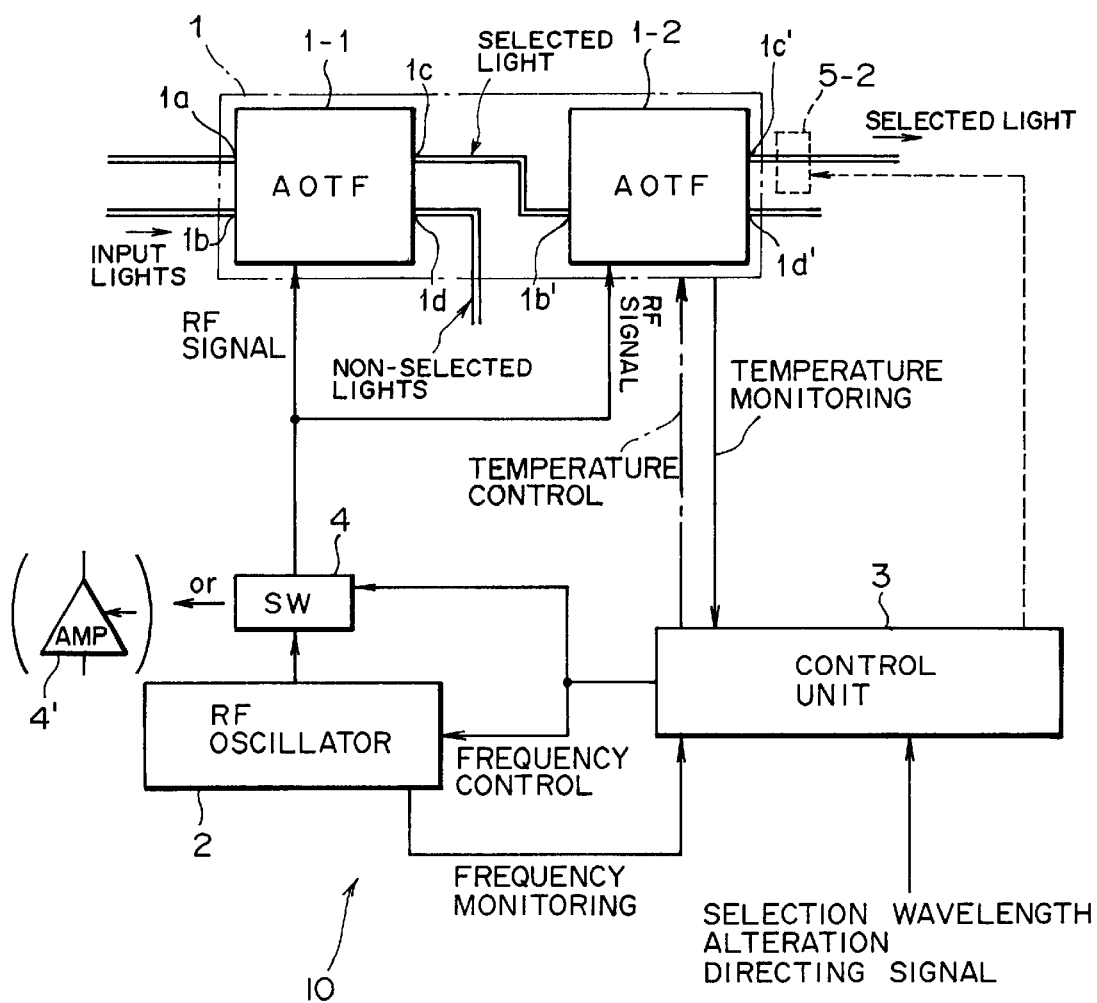
FIG. 1 is a block diagram showing a structure of an optical wavelength selective control apparatus according to a first embodiment (a first modification of a first embodiment) of this invention.

Hereinafter, description will be made of embodiments of the present invention, referring to the drawings.

(a) Description of a First Embodiment

FIG. 1 is a block diagram showing a structure of an optical wavelength selective control apparatus according to a first embodiment of this invention. As shown in FIG. 1, an optical wavelength selective control apparatus 10 has wavelength selective optical filters 1-1 and 1-2, an RF oscillator 2, a control unit 3 and a switch 4.

Each of the wavelength selective optical filters 1-1 and 1-2 extracts an optical signal at an arbitrary wavelength from wavelength division multiplexed optical signals obtained by wavelength-division-multiplexing optical signals at a plurality of wavelengths according to an RF signal (frequency signal) for selecting a wavelength. According to this embodiment, each of the wavelength selective optical filters 1-1 and 1-2 is configured with an acousto-optic tunable filter (AOTF) similar to that described before with reference to FIG. 10, and connected to one another to form a cascade, as shown in FIG. 1. Provided here that the AOTF 1-1 and 1-2 have the same temperature characteristics and are configured as one module (common module) 1.

The optical wavelength selective control apparatus 10 may be applied to each of the AOTFs 613-1 through 613-n in the sending system 61, each of the AOTFs 62a-1 through 62a-x in the receiving system 62, or the optical ADM unit 60 or the like of the optical ADM node 600 described before with reference to FIG. 13.

The RF (Radio Frequency) oscillator (frequency oscillator) 2 outputs a signal at a frequency corresponding to a wavelength of an optical signal to be selected (extracted) in each of the AOTFs 1-1 and 1-2 as an RF signal for selecting a wavelength to the AOTFs 1-1 and 1-2. According to this embodiment, there is employed, as the RF oscillator 2, an oscillating frequency variable type which can alter a frequency of an RF signal generated (oscillated) by the control unit 3.

The control unit 3 controls a frequency of the RF signal outputted from the RF oscillator 2. More specifically, the control unit 3 controls an oscillation frequency of the RF oscillator 2 according to information (selection wavelength alteration directing signal) on an optical signal at a wavelength to be extracted in each of the AOTFs 1-1 and 1-2.

The selection wavelength alteration directing signal is transmitted from a managing apparatus (not shown) in the system. Namely, the control unit 3 controls an oscillation frequency of the RF oscillator 2 according to a direction from the managing apparatus, thereby appropriately altering a selected wavelength in each of the AOTFs 1-1 and 1-2.

The control unit 3 monitors a temperature condition of the common module 1 to finely adjust a frequency of the RF signal from the RF oscillator 2 (an oscillation frequency of the RF oscillator 2) according to a change in temperature, thereby suppressing a temperature effect on a wavelength selecting process (degradation of accuracy of selecting a wavelength caused by deviation of the selected wavelength, etc.) in each of the AOTFs 1-1 and 1-2 to a minimum. It is thereby possible to perform a high-accurate wavelength selecting process in each of the AOTFs 1-1 and 1-2. In this case, a relation among a temperature of the devices (common module 1), a selected wavelength and a frequency of the RF signal is clarified in advance and stored as a correspondence table or the like in the control unit 3.

The switch (SW; first stopping unit) 4 is, as shown in FIG. 1, interposed between the AOTFs 1-1 and 1-2, and the RF oscillator 2 to stop an output of the RF signal from the RF oscillator 2. The switch 4 is controlled by the control unit 3 to be turned OFF to stop an output of the RF signal from the RF oscillator 2 while the control unit 3 alters an oscillation frequency of the RF oscillator 2 by receiving the above selection wavelength alteration directing signal, then controlled to be turned ON when the frequency of the RF oscillator 2 becomes an aimed frequency to allow the RF signal from the RF oscillator 2 to be outputted to each of the AOTFs 1-1 and 1-2. At this time, the control unit 3 monitors an oscillation frequency of the RF oscillator 2. It is therefore possible to output the RF signal at an appropriate timing from the RF oscillator 2.

Namely, the control unit 3 according to this embodiment controls the switch 4 to turn it OFF so as to stop an output of the RF signal from the RF oscillator 2 while altering an oscillation frequency of the RF oscillator 2. Accordingly, each of the AOTFs 1-1 and 1-2 does not select any wavelength other than a wavelength to be selected even when the oscillation frequency of the RF oscillator 2 is continuously altered.

Meanwhile, it is alternatively possible to interpose an amplifier (AMP) 4' instead of the above switch 4 as the above stopping unit between the AOTFs 1-1 and 1-2, and the RF oscillator 2 as shown in FIG. 1, whereby the control unit 3 adjusts an amplification factor (gain) of the amplifier 4' to stop an output of the RF signal while altering a frequency of the RF signal.

In this case, the control unit 3 diminishes an amplification factor of the amplifier 4' as much as possible so that a level (amplitude) of the RF signal is within a range that does not affect the wavelength selecting process in each of the AOTFs 1-1 and 1-2, whereby an output of the RF signal is stopped when looked from the side of the AOTFs 1-1 and 1-2.

Figure 2:
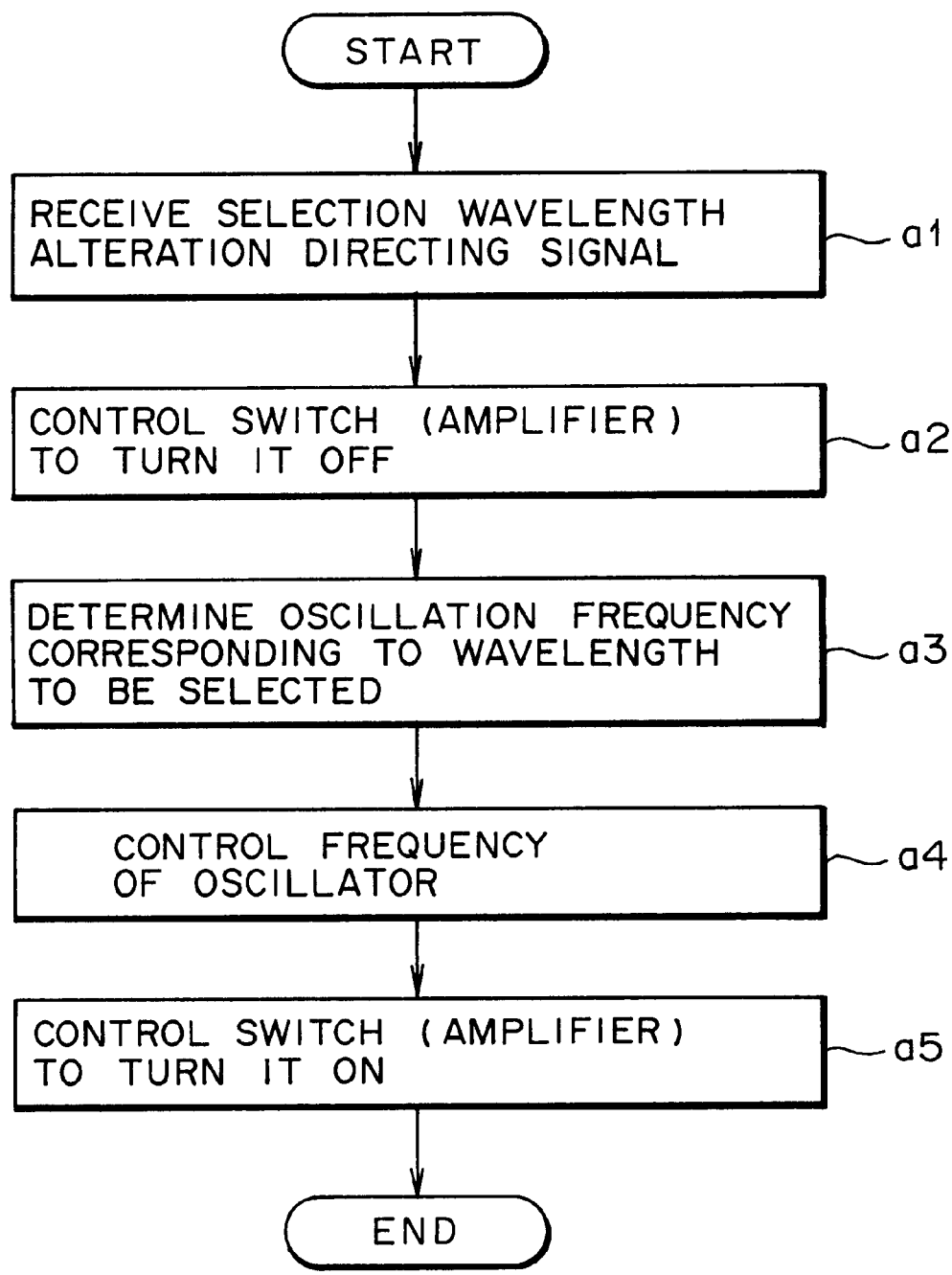
FIG. 2 is a flowchart for illustrating an operation of the optical wavelength selective control apparatus according to the first embodiment of this invention.

Hereinafter, description will be made of the wavelength selecting process performed by the above optical wavelength selective control apparatus 10, with reference to FIG. 2.

Here is described an operation in the case where the optical wavelength selective control apparatus 10 of this embodiment selects an optical signal at a wavelength $\lambda_1$ among WDM signals at wavelengths $\lambda_1$ through $\lambda_8$, for example. When optical signals at wavelength $\lambda_1$ through $\lambda_8$ are inputted from a light input port 1b of the AOTF 1-1, the AOTF 1-1 selects an optical signal at a wavelength $\lambda_1$ corresponding to the RF signal at a frequency $f_1$ supplied from the RF oscillator 2, and outputs the selected optical signal at a wavelength $\lambda_1$ from a light output port 1c.

The optical signal at a wavelength $\lambda_1$ outputted from the above light output port 1c is received by a light input port 1b' of the AOTF 1-2 in the following stage, and the AOTF 1-2 selects an optical signal at a wavelength $\lambda_1$ corresponding to the RF signal at a frequency $f_1$ supplied from the RF oscillator 2, like the AOTF 1-1.

Namely, in the optical wavelength selective control apparatus 10, the AOTF 1-2 can extract an optical signal at the same wavelength $\lambda_1$ similarly t the AOTF 1-1 by receiving an optical signal at a wavelength $\lambda_1$ extracted by the AOTF 1-1, with a cascade structure of the AOTFs 1-1 and 1-2. It is therefore possible to improve accuracy of selecting an optical signal at a wavelength to be selected.

At this time, the control unit 3 monitors a temperature condition of the common module 1, and finely adjusts an oscillation frequency from the RF oscillator 2 according to a change in temperature. An effect of the temperature on the wavelength selecting process in each of the AOTFs 1-1 and 1-2 may be thereby suppressed to the minimum so that an accuracy in selecting a wavelength in each of the AOTFs 1-1 and 1-2 is further improved.

Next, description will be made of an operation conducted when the optical wavelength selective control apparatus 10 switches the RF signal at a frequency $f_1$ from the RF oscillator 2 to an RF signal at a frequency $f_5$ in order to switch selection of an optical signal at a wavelength $\lambda_1$ to an optical signal at a wavelength $\lambda_5$ in the above state.

In the optical wavelength selective control apparatus 10, when the control unit 3 receives the selection wavelength alteration directing signal from the above managing apparatus (Step a1), the control unit 3 controls the switch 4 to turn it OFF (or controls a gain of the amplifier 4') to stop an output of the RF signal (Step a2).

The control unit 3 then determines a frequency $f_5$ corresponding to an optical signal at a wavelength $\lambda_5$ to be altered to on the basis of the above received selection wavelength alteration directing signal (Step a3), and controls an oscillation frequency of the RF oscillator 2 such that a frequency of the RF signal to the AOTFs 1-1 and 1-2 is the determined frequency $f_5$ (Step a4).

At this time, the control unit 3 monitors a temperature condition of the above common module 1, corrects (finely adjusts) an oscillation frequency at the time of a reference temperature of the AOTFs 1-1 and 1-2 on the basis of a result of the monitoring, alters (sweeps) a frequency of the RF oscillator 2, and controls the switch 4 to turn it ON when a value of the monitored frequency becomes $f_5$ (Step a5). A desired RF signal is thereby outputted to each of the AOTFs 1-1 and 1-2.

To the light input port la of the above AOTF 1-1, an optical signal at a wavelength corresponding to a vacant wavelength of an inputted optical signal, or an optical signal at a wavelength corresponding to a wavelength to be selected in the above AOTF 1-1 is added. The optical signals at wavelengths $\lambda_2$ through $\lambda_8$ having not been selected in the AOTF 1-1 are outputted from the light output port 1d.

According to the optical wavelength selective control apparatus 10 of the first embodiment of this invention, a plurality of AOTFs 1-1 and 1-2 are connected to one another to form a cascade, besides the RF signal at a frequency corresponding to a wavelength to be selected is supplied from the RF oscillator 2 to each of the AOTFs 1-1 and 1-2, whereby the wavelength selecting process is performed plural times on optical signals at the same wavelength. This largely improves a quality of the selected optical signal, and accomplish a satisfactory extinction ratio required by the WDM transmission system.

In particular, this embodiment can yield a satisfactory extinction ratio (45 dB or so) required by a WDM transmission system (including an optical ADM node) multiplexing and transmitting lights at eight wavelengths over one optical fiber, hence can largely improve a performance of the WDM transmission system.

In this embodiment, the control unit 3 controls the switch 4 to turn it OFF while altering an oscillation frequency of the RF oscillator 2, thereby further improving the wavelength selecting accuracy. However, even only a cascade structure of the AOTFs 1-1 and 1-2 (without a control on the switch) can improve accuracy of the wavelength selecting process and yield a desired extinction ratio.

Alternatively, the above control unit 3 may directly control a temperature of the above common module 1 using, for example, Peltier effect such that a temperature of the common module 1 is a predetermined temperature (most suitable for the above wavelength selecting process). In which case, it is possible to perform the wavelength selecting process under a stable temperature condition in the AOTFs 1-1 and 1-2 at all times as well so that no fine adjustment on an oscillation frequency of the RF oscillator 2 is required.

(b) Description of a Second Embodiment

Figure 3:
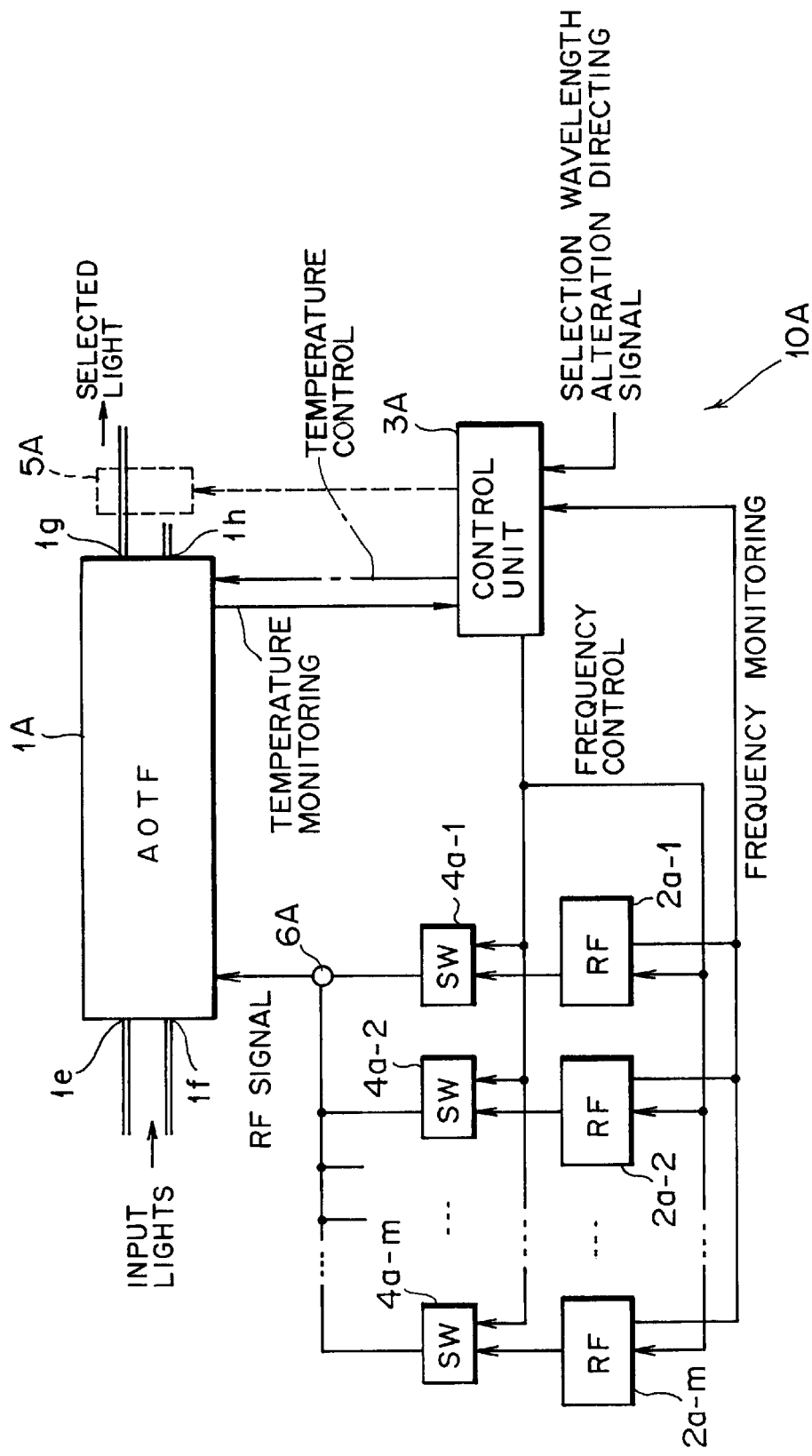
FIG. 3 is a block diagram showing a structure of an optical wavelength selective control apparatus according to a second embodiment of this invention.

FIG. 3 is a block diagram showing a structure of an optical wavelength selective control apparatus according to a second embodiment of this invention. An optical wavelength selective control apparatus 10A shown in FIG. 3 has a wavelength selecting unit 1A, RF oscillators 2a-1 through 2a-m (m is a natural number not less than 2), a control unit 3A, switches 4a-1 through 4a-m and a coupler 6A.

Figure 12:
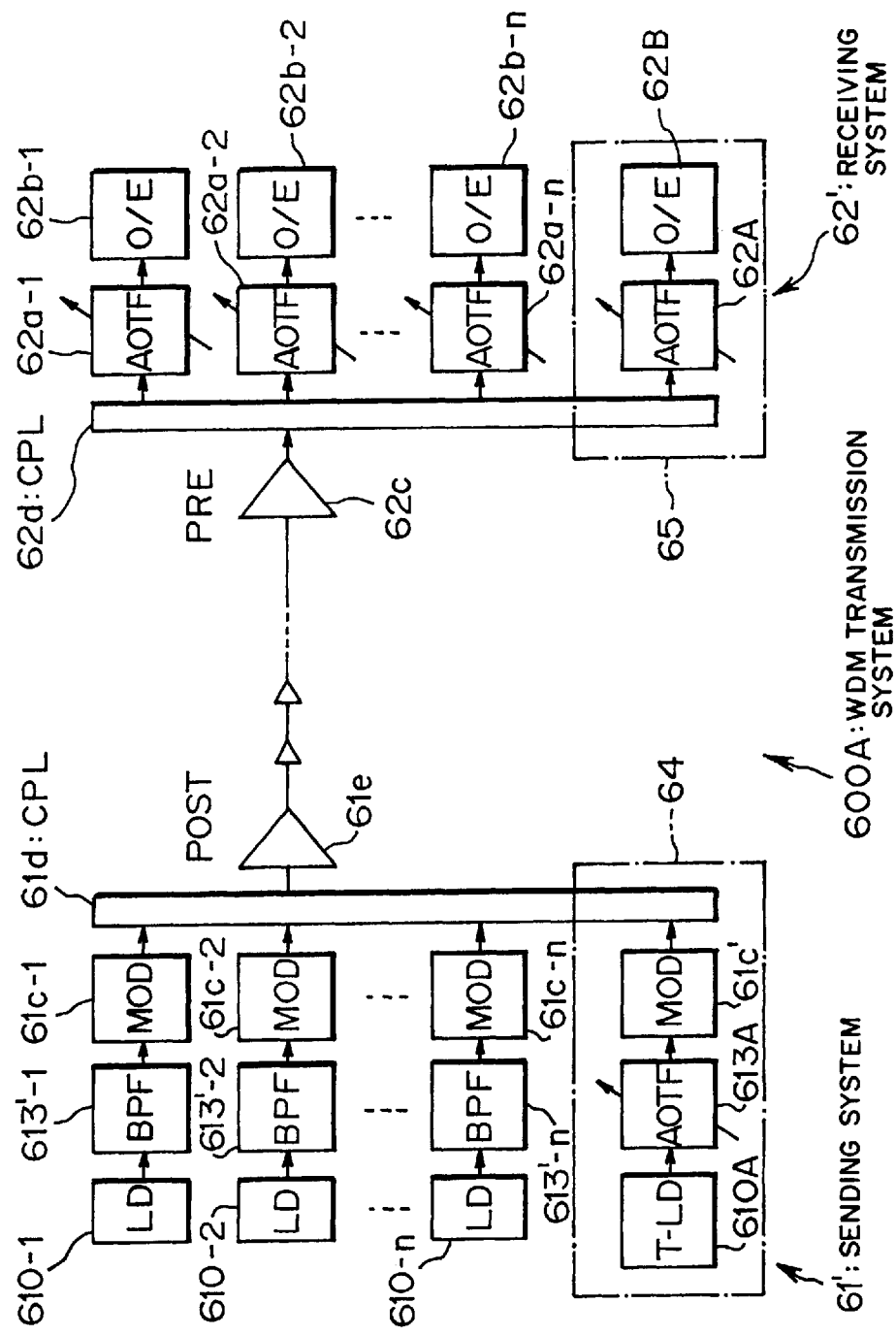
FIG. 12 is a block diagram showing an example of a structure of a WDM transmission system.
Figure 13:
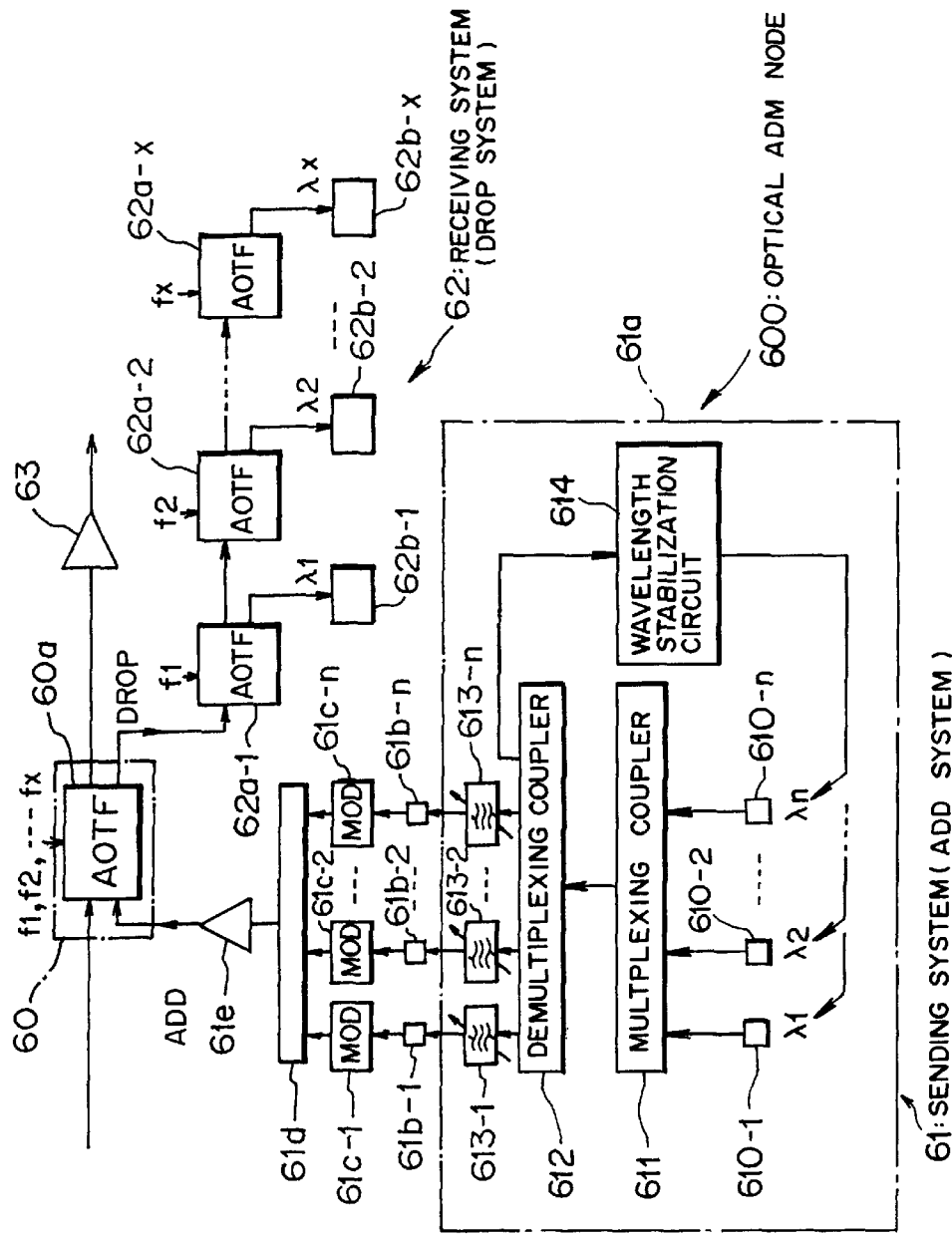
FIG. 13 is a block diagram showing an example of a structure of an optical ADM node.
Figure 14:
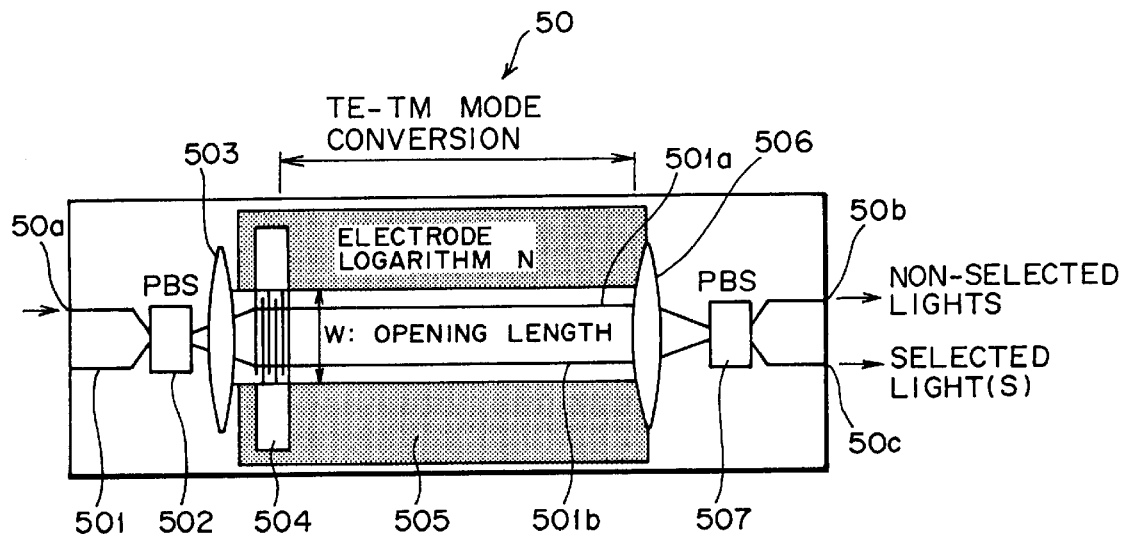
FIG. 14 is a block diagram showing a structure of an AOTF.
Figure 15:
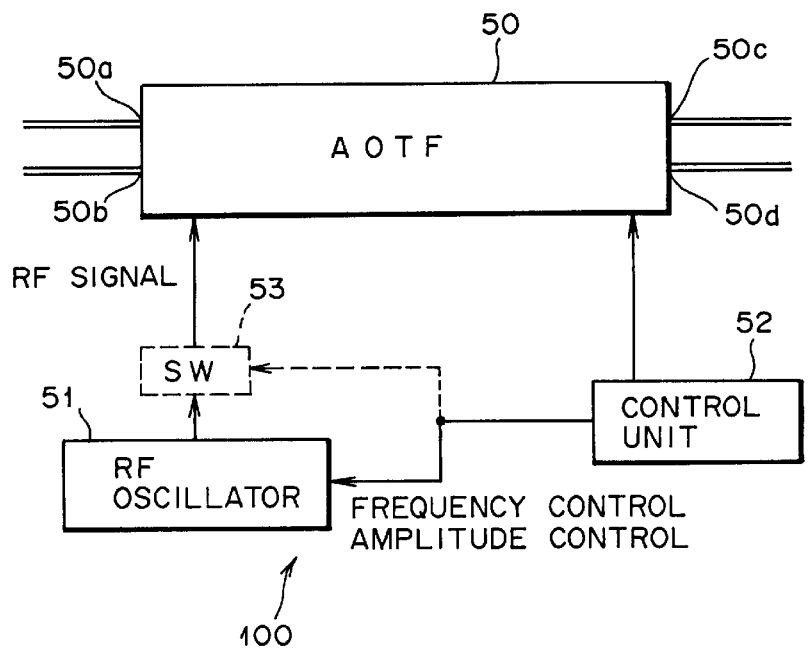
FIG. 15 is a block diagram showing an example of an optical wavelength selective control apparatus.

In concrete, the optical wavelength selective control apparatus 10A is for selecting multiple wavelengths, which can be applied to the optical ADM unit 60 of the optical ADM node 600 shown in FIG. 13, or the transmit light source redundant unit 64 of the WDM transmission system 600A shown in FIG. 12, or the like. In the case of the transmit light source redundant unit 64 shown in FIG. 12, for example, it is possible to simultaneously back up a transmitting function for plural wavelengths when a trouble occurs therein.

The wavelength selecting unit 1A extracts optical signals at a maximum of m (m is a natural number satisfying 1<m<N) wavelengths from wavelength division multiplexed optical signals obtained by wavelength-division-multiplexing optical signals at N (N is a natural number not less than 2) wavelengths according to RF signals (frequency signals) for selecting wavelengths, which is configured with an acousto-optic tunable filter (AOTF; refer to FIG. 10) as a wavelength selective optical filter, in the same way as the first embodiment.

In concrete, the AOTF 1A is supplied the RF signals corresponding to plural wavelengths to be selected from arbitrary RF oscillators 2a-1 through 2a-m so as to select optical signals at plural wavelengths from optical signals inputted from a light input port 1f. The optical signals at the selected wavelengths are outputted from a light output port 1g, whereas optical signals at wavelengths not selected are outputted from a light output port 1h.

Each of the RF oscillators (frequency oscillators) 2a-1 through 2a-m outputs a signal at a frequency corresponding to a wavelength of an optical signal to be extracted in the AOTF 1A as the RF signal for selecting a wavelength to the AOTF 1A. According to this embodiment, a frequency of the RF signal to be supplied to the AOTF 1A is controlled to a desired value according to a frequency control signal from the control unit 3A.

The number of the RF oscillators 2a-1 through 2a-m (m) is less than N that is the number of inputted wavelengths. The RF signals from the RF oscillators 2a-1 through 2a-m are multiplexed by the coupler 6A and supplied to the AOTF 1A.

The control unit 3A controls each of frequencies of the RF signals outputted from the RF oscillators 2a-1 through 2a-m. When receiving information for altering an optical signal at a wavelength to be extracted (selection wavelength alteration directing signal) from a managing apparatus (not shown) managing the whole system, the control unit 3 alters an oscillation frequency of a corresponding RF oscillator 2a-1, 2a-2, . . . or 2a-m according to the directing signal.

Like the control unit 3 according to the first embodiment, the control unit 3A monitors a temperature condition of the AOTF 1A so as to finely adjust oscillation frequencies of the RF oscillators 2a-1 through 2a-m according to a change in temperature of the AOTF 1A.

Each of the switches (stopping units) 4a-1 through 4a-m can stop an output of the RF signal from a corresponding RF oscillator 2a-1, 2a-2, . . . or 2a-m. In concrete, while altering a frequency of the RF signal outputted from the RF oscillator 2a-1, 2a-2, . . . or 2a-m, the control unit 3A controls a corresponding switch 4a-1, 4a-2, . . . or 4a-m to turn it OFF, so as to stop an output of the RF signal from the RF oscillator 2a-1, 2a-2, . . . or 2a-m.

For example, when altering wavelengths $\lambda_1$ through $\lambda_4$ to wavelengths $\lambda_1$, $\lambda_2$, $\lambda_5$, and $\lambda_6$ of optical signals to be extracted in a state where optical signals at the wavelengths $\lambda_1$ through $\lambda_4$ are being extracted from WDM signals at wavelengths $\lambda_1$ through $\lambda_8$ in the AOTF 1A, the control unit 3A shifts from a state where the control units 3A controls the RF oscillators 2a-1 through 2a-4 to oscillate frequencies $f_1$, through $f_4$ corresponding to the wavelengths $\lambda_1$ through $\lambda_4$ to a state where the control unit 3A controls the RF oscillators 2a-1 through 2a-4 to output frequencies $f_1$, $f_2$, $f_5$, and $f_6$ corresponding to the wavelengths $\lambda_1$, $\lambda_2$, $\lambda_5$, and $\lambda_6$ by receiving the above selection wavelength alteration directing signal.

In this case, the control unit 3A controls the switches 4a-3 and 4a-4 to stop outputs from the RF oscillators 2a-3 and 2a-4, alters frequencies outputted from the RF oscillator 2a-3 and 2a-4 from $f_3$ and $f_4$ to $f_5$, and $f_6$, then controls the switches 4a-3 and 4a-4 to turn them ON.

According to this embodiment, the optical wavelength selective control apparatus 10A is realized with a less number of the RF oscillators 2a-1 through 2a-m than the number of wavelengths of WDM signals. Therefore, a structure of the circuit may be simplified.

The coupler 6A multiplexes frequencies of the RF signals inputted from the RF oscillators 2a-1 through 2a-m via the switches 4a-1 through 4a-m, and outputs them to the AOTF 1A.

Hereinafter, the wavelength selecting process in the optical wavelength selective control apparatus 10A will be described in detail, with reference to FIG. 4, by way of example where the optical wavelength selective control apparatus 10A alters wavelengths $\lambda_1$ through $\lambda_4$ to wavelengths $\lambda_1$, $\lambda_2$, $\lambda_5$, and $\lambda_6$ of optical signals to be extracted in a state where optical signals at the wavelengths $\lambda_1$ through $\lambda_4$ are being extracted from WDM signals at wavelengths $\lambda_1$ through $\lambda_8$ using the four RF oscillators 2a-1 through 2a-4 (oscillation frequencies $f_1$, through $f_4$).

Now, in the optical wavelength selective control apparatus 10A, the RF oscillators 2a-1 through 2a-4 oscillate frequencies $\lambda_1$ through $\lambda_4$ so that the AOTF 1A extracts optical signals at wavelengths $\lambda_1$ through $\lambda_4$. At this time, the switches 4a-1 through 4a-4 are being controlled by the control unit 3A to be turned ON.

In this state, when the control unit 3A in the optical wavelength selective control apparatus 10 receives the selection wavelength alteration directing signal (Step b1), the control unit 3A controls the switches 4a-3 and 4a-4 for the RF oscillators 2a-3 through 2a-4 outputting frequencies ($f_3$ and $f_4$) corresponding to wavelengths to be altered to stop outputs of the RF signals (frequencies $f_3$ and $f_4$) (Step b2).

The control unit 3A determines frequencies corresponding to optical signals at wavelengths $\lambda_5$ and $\lambda_6$ to be altered to on the basis of the above received selection wavelength alteration directing signal (Step b3), and controls oscillation frequencies of the corresponding RF oscillators 2a-3 and 2a-4 such that the RF signals to the AOTF 1A are at the predetermined frequencies $f_5$ and $f_6$ (Step b4).

At this time, the control unit 3A monitors a temperature condition of the AOTF 1A, corrects (finely adjusts) the oscillation frequencies at the time of a reference temperature of the AOTF 1A on the basis of a result of the monitoring, alters (sweeps) the frequencies of the RF oscillators 2a-3 and 2a-4, and controls the corresponding switches 4a-3 and 4a-4 to turn them ON when values of the monitored frequencies become $f_5$ and $f_6$ (Step b5). The altered RF frequencies $f_5$ and $f_6$ are outputted to the AOTF 1A.

As above, the optical wavelength selective control apparatus 10A according to the second embodiment of this invention stops outputs of the RF signals by means of the switches 4a-1 through 4a-m when altering selected wavelengths, then alters frequencies of the RF signals from the RF oscillators 2a-1 and 2a-m which are objects of the alteration to desired values so that any other optical signals that are not objects of the selection do not leak as selected optical signals when selected wavelengths are altered. It is therefore possible to extract optical signals at wavelengths to be selected highly accurately. This largely improves a performance of the WDM transmission system.

The above optical wavelength selective control apparatus 10A requires a less number of RF oscillators 2a-1 through 2a-m than the number of wavelengths of WDM signals. This is advantageous to configure the apparatus with a simplified circuit.

The above description has been made by way of example where frequencies among frequencies outputted to the AOTF 1A are altered from $f_3$ and $f_4$ to $f_5$ and $f_6$ in the RF oscillators 2a-3 and 2a-4. If five RF oscillators 2a-1 through 2a-5 are provided to the apparatus 10A and the similar altering direction is given (altering from selection of $\lambda_1$ through $\lambda_4$ to selection of $\lambda_1, \lambda_2, \lambda_5$, and $\lambda_6$), the control unit 3A may control the switches 4a-3 and 4a-4 to turn them OFF to stop outputs of the above RF oscillators 2a-3 and 2a-4, after that, alter a frequency $f_3$ (or $f_4$) outputted from the RF oscillator 2a-3 (or 2a-4) to either one ($f_5$) of the frequencies that are directed to be altered, and allow the other frequency ($f_6$) to be outputted from the RF oscillator 2a-5.

In this case, when altering frequencies, the control unit 3A controls the switches 4a-3 and 4a-4 to turn them OFF to stop outputs from the RF oscillators 2a-3 and 2a-4, alters a frequency of the RF oscillator 2a-3 (or 2a-4) to $f_5$, controls the switch 4a-3 (or 4a-4) to turn it ON to output the RF signal at the frequency $f_5$ while controlling the switch 4a-5 to turn it ON to output the RF signal at a frequency $f_6$ from the RF oscillator 2a-5.

As above, it is possible to determine the RF oscillators 2a-1 through 2a-m to be altered according to a relation between frequencies that are directed to be altered and frequencies actually oscillated, and the number of the provided RF oscillators 2a-1 through 2a-m. If only some of the provided RF oscillators 2a-1 through 2a-m are used for the wavelength selecting process, an ON/OFF control on the switches 4a-1 through 4a-m may be limited, thereby driving only the RF oscillators (for example, four in the above case) being now used in the wavelength selecting process, or driving all of the m RF oscillators (for example, five in the above case).

It is alternatively possible in this embodiment that the control unit 3A directly controls a temperature of the AOTF 1A using Pertier effect such that a temperature of the AOTF 1A is a predetermined temperature.

Further, the above switches 4a-1 through 4a-m may be replaced with amplifiers 4' (refer to FIG. 1), in the same way as the first embodiment. Functions and effects in such case are similar to the above-described first embodiment, descriptions of which are omitted.

(c) Description of a Third Embodiment

Figure 5:
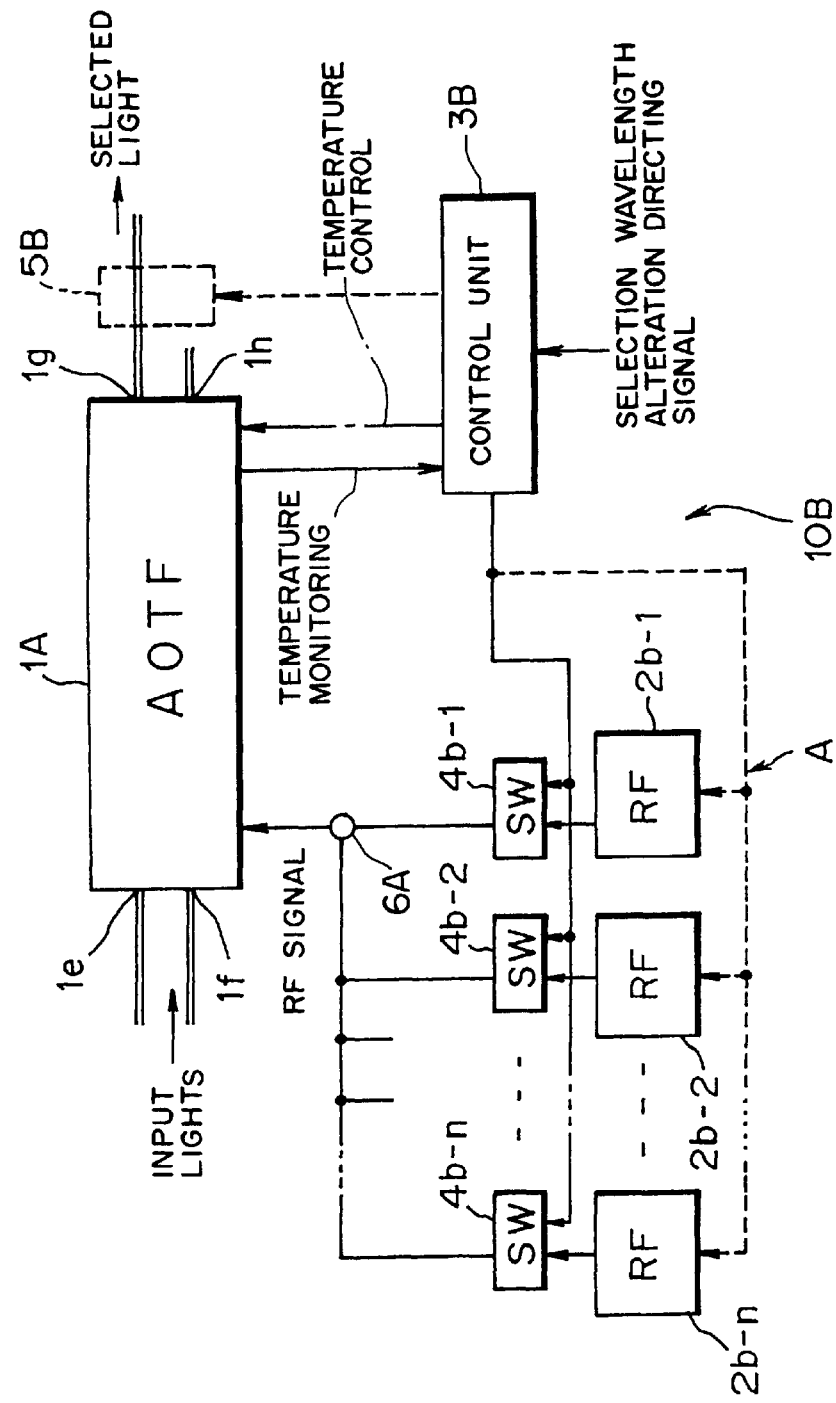
FIG. 5 is a block diagram showing a structure of an optical wavelength selective control apparatus according to a third embodiment of this invention.

FIG. 5 is a block diagram showing a structure of an optical wavelength selective control apparatus according to a third embodiment of this invention. An optical wavelength selective control apparatus 10B shown in FIG. 5 has a wavelength selecting unit 1A configured with an AOTF, RF oscillators 2b-1 through 2b-n (n is a natural number not less than 2), a control unit 3B, switches 4b-1 through 4b-n and a coupler 6A. The optical wavelength selective control apparatus 10B can be used in an appropriate portion in a WDM transmission system 600A (refer to FIG. 12), an optical ADM node 600 (refer to FIG. 13), or the like, similarly to the above second embodiment.

The optical wavelength selective control apparatus 10B shown in FIG. 5 is provided with n RF oscillators 2b-1 through 2b-n and n switches 4b-1 through 4b-n, whose numbers (n) are equal to the number of sorts (N) of inputted wavelengths, unlike the optical wavelength selective control apparatus 10A according to the second embodiment (refer to FIG. 3), where each of the RF oscillators 2b-1 through 2b-n outputs the RF signal at a fixed frequency ($f_1$ $f_2$, . . . , or $f_n$) (without a control by the control unit 3 to alter the frequency).

When altering wavelengths to be selected in the AOTF 1A, a control unit 3B according to the third embodiment controls a corresponding switch 4b-1, 4b-2, . . . or 4b-n to allow transmission of an output of the RF signal corresponding to a wavelength that is targeted in alteration, while controlling the remaining switches 4b-1, 4b-2, . . . or 4b-n provided on the output's side of the RF oscillators 2b-1 through 2b-n to turn them OFF (OFF control) to stop outputs of the RF signals other than the RF signal corresponding to the wavelength that is targeted in alteration.

Namely, if a maximum number of the optical signals m (m is a natural number satisfying $1 < m \leq N$) to be selected (or not selected) is determined in advance, the optical wavelength selective control apparatus 10B is provided with the RF oscillators 2b-1 through 2b-n and the switches 4b-1 through 4b-n equal in number to the maximum number, whereby the AOTF 1A can select optical signals at arbitrary m wavelengths only by switching ON/OFF of the switches 4b-1 through 4b-n.

Like the control units 3 and 3A according to the above first and second embodiments, the control unit 3B monitors a temperature condition of the AOTF 1A so as to finely adjust oscillation frequencies of the RF signals of the RF oscillators 2b-1 through 2b-n according to a change in temperature of the AOTF 1A (refer to a broken line A in FIG. 5).

Figure 4:
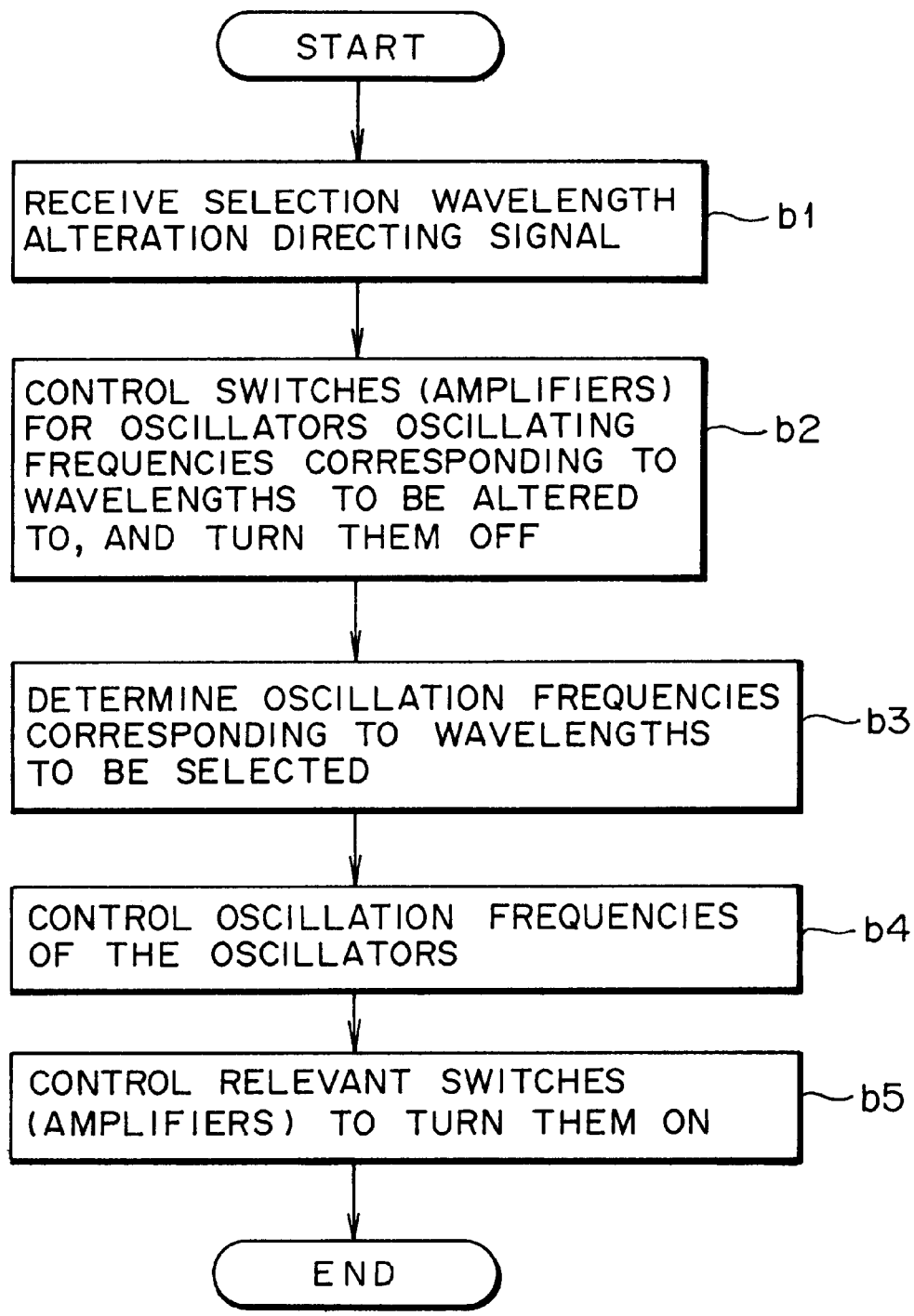
FIG. 4 is a flowchart for illustrating an operation of the optical wavelength selective control apparatus according to the second embodiment of this invention.

With above structure, the optical wavelength selective control apparatus 10B shown in FIG. 5 operates substantially similarly to the optical wavelength selective control apparatus 10A according to the above second embodiment (refer to FIG. 4).

However, in the optical wavelength selective control apparatus 10B of this embodiment, it is unnecessary to control (sweep) frequencies of the RF oscillators 2b-1 through 2b-n at Step b4 in the flowchart shown in FIG. 4 when wavelengths to be selected are altered. It is only necessary to control the switches 4b-1 through 4b-n corresponding to wavelengths to be selected that are targets in the alteration to turn them ON, while controlling the switches 4b-1 through 4b-n corresponding to wavelengths not to be selected to turn them OFF, so as to alter the selected wavelength in the AOTF 1A.

When wavelengths of optical signals to be extracted are altered from $\lambda_1$ through $\lambda_4$ to $\lambda_1$, $\lambda_2$, $\lambda_5$, and $\lambda_6$ in a state where optical signals $\lambda_1$ through $\lambda_4$ are extracted from WDM signals at wavelengths $\lambda_1$ through $\lambda_8$, for example, frequencies $f_1$, through $f_4$ outputted from the RF oscillators 2b-1 through 2b-4 are altered by controlling the switches 4b-3 and 4b-4 to turn them OFF., while the switches 4b-5 and 4b-6 are controlled to be turned ON according to the selection wavelength alteration directing signal, whereby the frequencies $f_5$ and $f_6$ after the alteration are outputted.

As above, the optical wavelength selective control apparatus 10B according to the third embodiment of this invention is provided with the RF oscillators 2b-1 through 2b-n equal in number to wavelengths (N) of inputted optical signals, and stops outputs of the RF signals of RF oscillators 2b-1 through 2b-n other than RF oscillators 2b-1 through 2b-n corresponding to wavelengths to be selected in the AOTF 1A by controlling the corresponding switches 4b-1 through 4b-n to turn them OFF. It is therefore possible to alter wavelengths to be selected in the AOTF 1A only by individually controlling the switches 4b-1 through 4b-n to turn them ON/OFF. Accordingly, this embodiment may largely improve accuracy of the wavelength selecting process, improve a quality of optical signals at wavelengths to be selected, and realize a quick wavelength selecting process.

In this embodiment, it is alternatively possible that the above control unit 3B directly controls a temperature of the AOTF 1A using Pertier effect such that a temperature of the AOTF 1A is a predetermined temperature. Further, the switches 4b-1 through 4b-n may be configured as amplifiers.

(d) Description of Modifications

Hereinafter, description will be made of modifications of the above embodiments.

(d-1) Description of a First Modification of the First Embodiment

The optical wavelength selective control apparatus 10 according to the above first embodiment may be provided with an optical switch 5-2 as indicated by broken line in FIG. 1, for example, on the outputting side (the following stage) of the common module 1 (AOTFs 1-1 and 1-2).

The optical switch (second stopping units) 5-2 can stop an output of an optical signal extracted in the common module 1 (AOTFs 1-1 and 1-2), which is controlled by the control unit 3 to be turned OFF to stop an output of a selected optical signal from the AOTFS 1-1 and 1-2 while the control unit 3 alters a frequency of the RF signal outputted from the RF oscillator 2.

Namely, the optical switch 5-2 does not transmit any optical signal at a wavelength outputted from the light output port 1c' as a selected output port of the AOTFs 1-1 and 1-2 while an oscillation frequency (hereinafter, called an RF frequency, occasionally) of the RF signal of the RF oscillator 2 is altered.

It is thereby possible to prevent optical signals at other wavelengths not selected from being transmitted more certainly, and highly accurately extract an optical signal at a wavelength to be selected.

The optical switch 5-2 may be provided in the front stage of the common module 1. If each of the AOTFS 1-1 and 1-2 is configured as an individual module, the optical switch 5-2 may be provided between the AOTFs 1-1 and 1-2, or provided between the AOTFS 1-1 and 1-2 and in the following stage of the AOTF 1-2, or provided in the front stage of the AOTF 1-1, between the AOTFs 1-1 and 1-2 and in the following stage of the AOTF 1-2. In any case, the optical switch 5-2 is controlled by the control unit 3 to be turned OFF while the RF frequency is altered so that no optical signal is inputted to the AOTFs 1-1 and 1-2. Therefore, it is possible to prevent transmission of an optical signal at any wavelength, thus to prevent transmission of optical signals at other wavelengths not selected, more certainly.

(d-2) Description of a Second Modification of the First Embodiment

The optical wavelength selective control apparatus 10 according to the first embodiment has been described by way of example where the AOTFs 1-1 and 1-2 have the same temperature characteristic and are configured as a common module 1. However, the AOTFs 1-1 and 1-2 may have different temperature characteristics or be configured as separate modules (individual modules). Hereinafter, description will be made of an apparatus adaptable to such cases.

(d-2-1) In the case where the AOTFs 1-1 and 1-2 have different temperature characteristics and are configured as one common module.

In this case, RF frequencies to be supplied (applied) to the AOTFs 1-1 and 1-2 might be different from each other since temperature characteristics of the AOTFs 1-1 and 1-2 are different. In such case, as shown in FIG. 8, for example, a plural number of the RF oscillators 2 and the switches 4 described above are provided correspondingly to the AOTFs 1-1 and 1-2, and the control unit 3 controls each of the switches 4, while controlling each of the RF oscillators 2 according to a change in temperature of the common module 1 and the temperature characteristics of each of the AOTFS 1-1 and 1-2 to adjust each of the RF frequencies.

In this case, a relation among a temperature of each of the AOTFS 1-1 and 1-2, a selected wavelength and each of the RF frequencies are clarified in advance and stored as a correspondence table or the like in the control unit 3.

Figure 8:
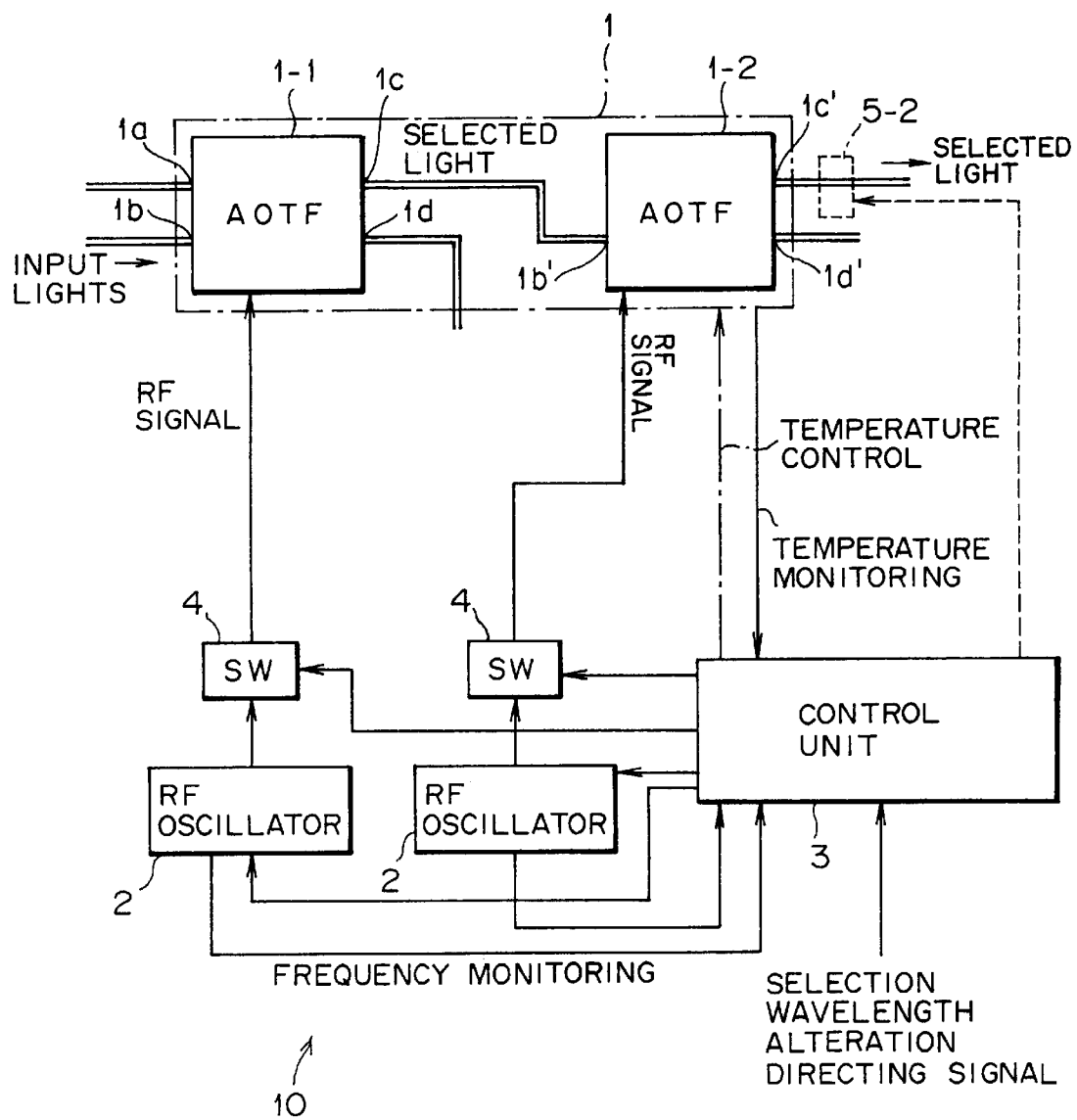
FIGS. 8 through 10 are block diagrams showing structures according to a second modification of the first embodiment.

The optical wavelength selective control apparatus 10 shown in FIG. 8 can adjust the RF frequencies of the RF oscillators 2 to optimum values for wavelength selection in the AOTFs 1-1 and 1-2 according to the temperature characteristics of the AOTFs 1-1 and 1-2 even if the temperature characteristics of the AOTFs 1-1 and 1-2 configuring the common module 1 are different from each other, so as to perform a highly accurate wavelength selecting process.

In this case, a switch 5-2 for preventing transmission of non-selected lights while a frequency of each of the RF oscillators 2 is altered (at the time of switching of the selected wavelength) may be provided in the following stage (or in the front stage) of the common module 1, as indicated by broken line in FIG. 8. Further, the control unit 3 may directly control a temperature of the common module 1 using Peltier effect such that a temperature of the common module 1 is a predetermined temperature.

Namely, the control unit 3 controls each of the switches 4, and controls a temperature of the common module 1 such that a temperature of the common module 1 is a predetermined temperature while controlling each of the RF oscillators 2 according to temperature characteristics of each of the AOTFs 1-1 and 1-2 to adjust each of the RF frequencies, in this case.

(d-2-2) In the case where the AOTFs 1-1 and 1-2 have different temperature characteristics and are configured as separate modules (individual modules)

Figure 9:
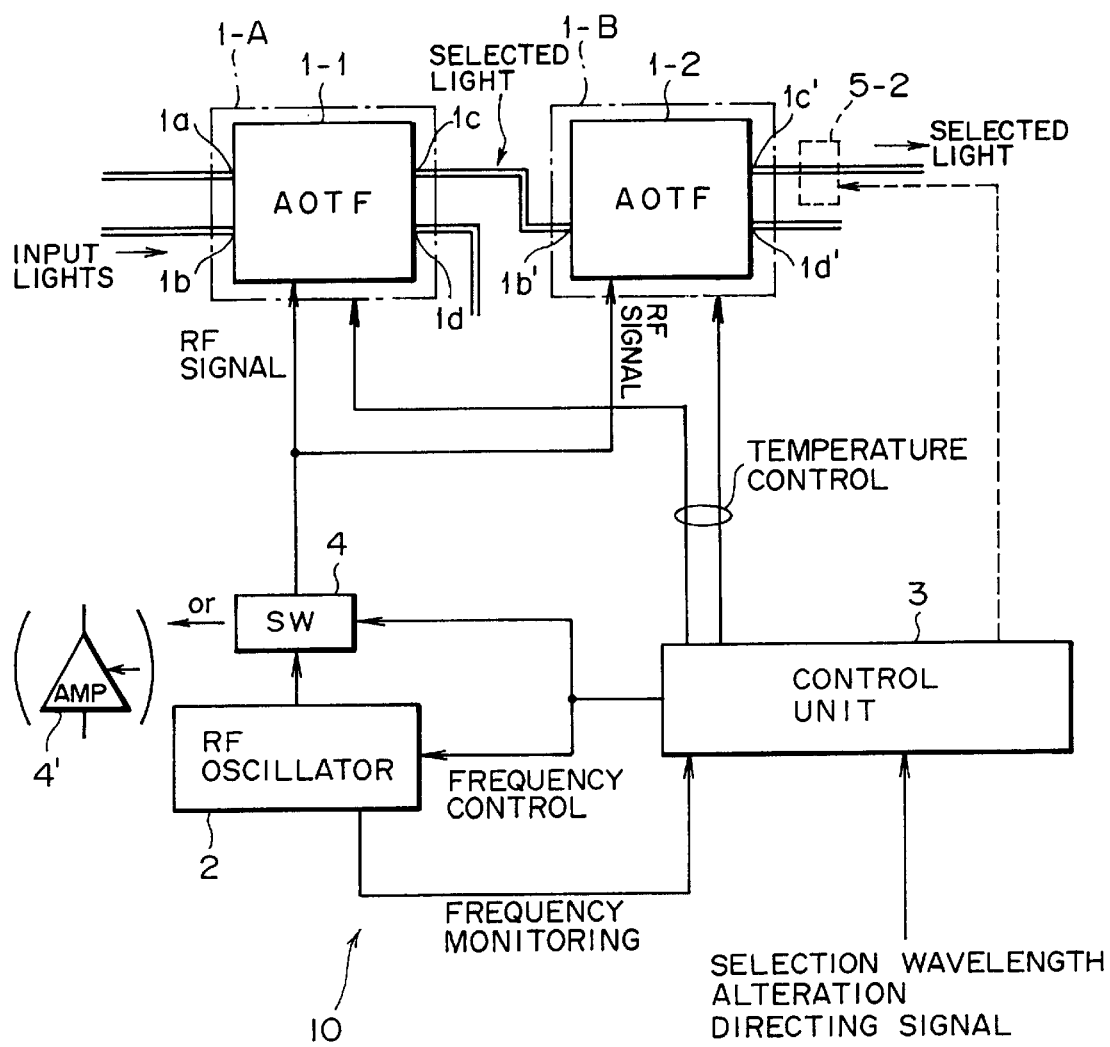

In this case, a structure of the optical wavelength selective control apparatus 10 adapted when a temperature control is conducted is different from a structure of the same adapted when a temperature monitoring is conducted. In the case of the temperature control, the control unit 3 controls a temperature of each of the individual modules 1-A and 1-B such that a temperatures of each of the individual modules 1-A and 1-B is a predetermined temperature at which the RF frequency is constant according to temperature characteristics of the each of the AOTFs 1-1 and 1-2, as shown in FIG. 9. With such structure, it is possible to improve accuracy of the wavelength selecting process in each of the AOTFs 1-1 and 1-2 even with the RF oscillator 2 and the switch 4 common to both the AOTFs 1-1 and 1-2 if the AOTFs 1-1 and 1-2 having different temperature characteristics are configured as separate modules 1-A and 1-B.

Figure 10:
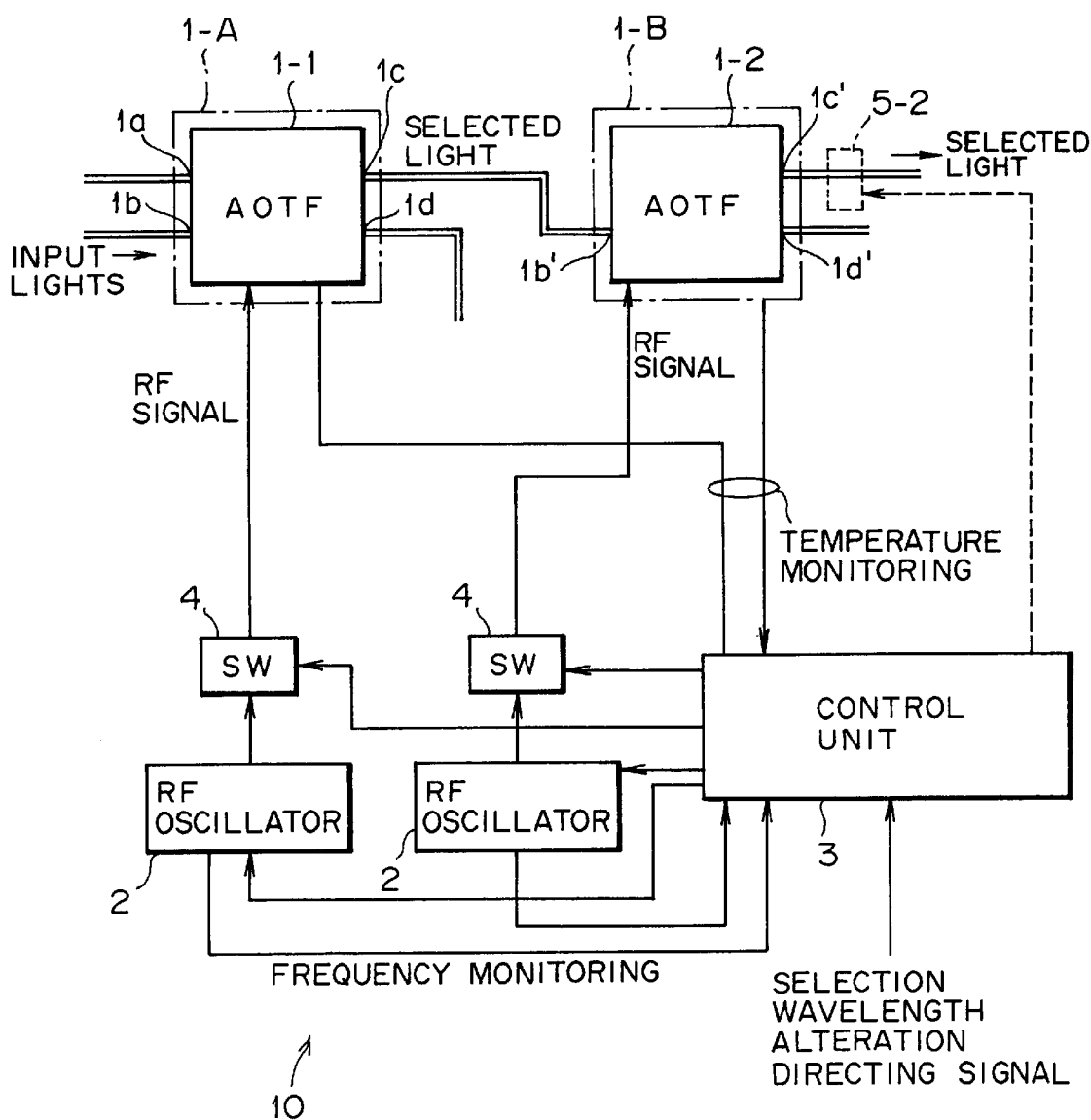

In the case of the temperature monitoring, a optimum RF frequency is varied depending on temperature conditions of each of the modules 1-A and 1-B. As shown in FIG. 10, for example, a plural number (two) of the RF oscillators 2 and the switches 4 described above are provided correspondingly to the AOTFs 1-1 and 1-2, and the control unit 3 controls each of the switches 4, while controlling each of the RF oscillators 2 according to a change in temperature of each of the modules 1-A and 1-B to adjust each of the RF frequencies.

The optical wavelength selective control apparatus 10 shown in FIG. 10 can thereby adjust the RF frequency of each of the RF oscillators 2 to an optimum value for wavelength selection in each of the AOTFs 1-1 and 1-2 according to temperature conditions of each of the modules 1-A and 1-B even if the AOTFs 1-1 and 1-2 have different temperature characteristics and are configured as the individual modules 1-A and 1-B.

In any case, a switch 5-2 for preventing transmission of non-selected lights while a frequency of the RF oscillator 2 is altered (at the time of switching of the selected wavelength) may be disposed in the following stage of the module 1-B (in the front stage of the module 1-B, in the front stage of the module 1-A and between the modules 1-A and 1-B), or disposed between the modules 1-A and 1-B and in the following stage of the module 1-B, or disposed in the front stage of the module 1-A, between the modules 1-A and 1-B and in the following stage of the module 1-B.

(d-3) Description of a First Modification of the Second Embodiment.

Figure 6:
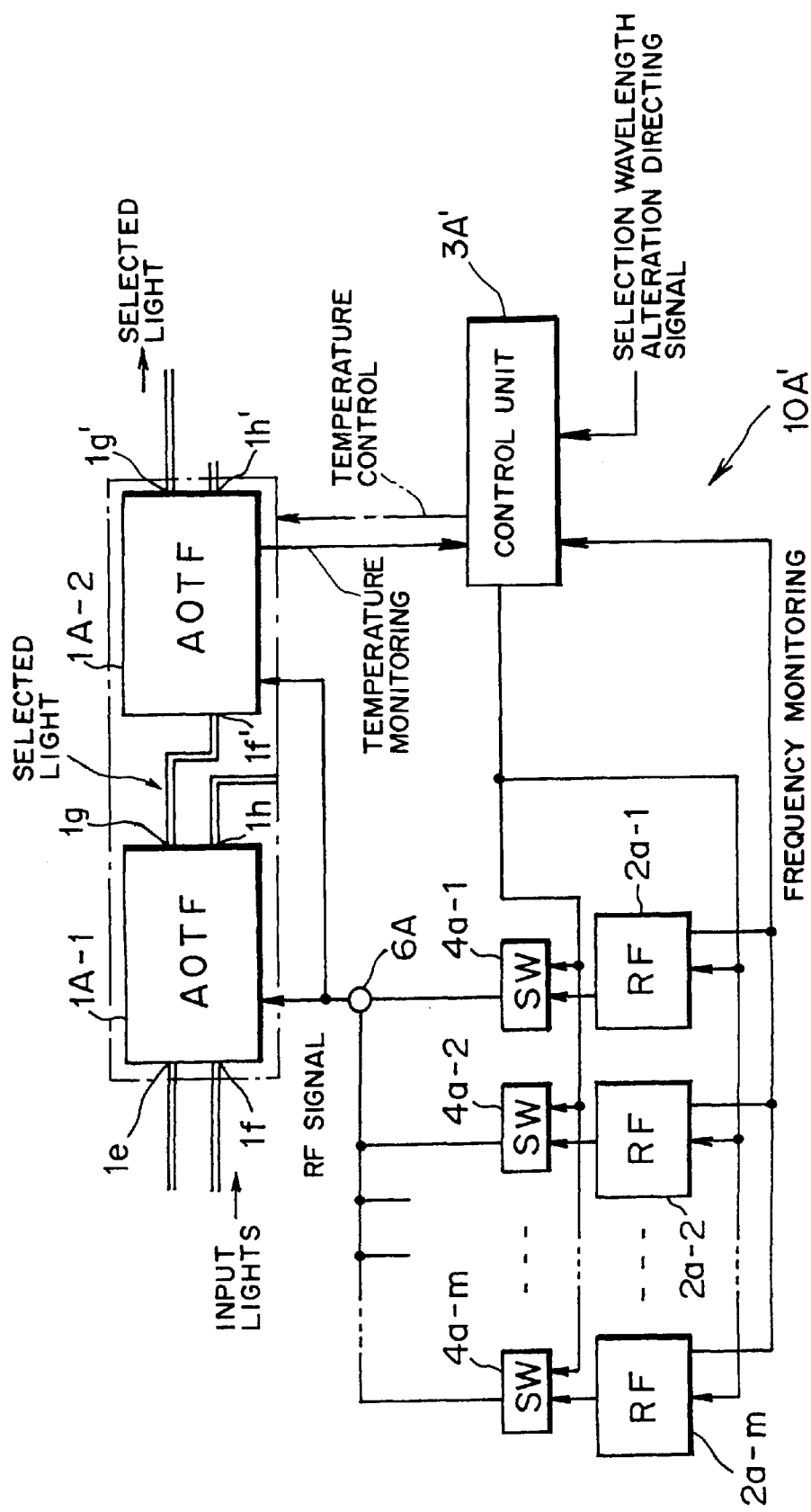
FIG. 6 is a block diagram showing a structure according to a first modification of the second embodiment of this invention.

As shown in FIG. 6, the optical wavelength selective control apparatus 10A (refer to FIG. 3) according to the above second embodiment may be provided with a plurality of AOTFs 1A-1 and 1A-2, for example, connected to one another to form a cascade similarly to those shown in FIG. 1. In this case, the AOTFs 1-1 and 1-2 have the same temperature characteristics and are configured as one module (common module) 1.

Namely, each of the AOTF 1A-1 and 1A-2 extracts optical signals at arbitrary m wavelengths from WDM signals according to the RF signals from the RF oscillators 2a-1 through 2a-m.

In this case, when altering oscillated frequencies of some of the RF oscillators 2a-1 through 2a-m to alter a part of selected wavelengths, the control unit 3A' controls all of the switches 4a-1 through 4a-m to turn them OFF once to stop outputs from all of the RF oscillators 2a-1 through 2a-m, then controls all the switches 4a-1 through 4a-m to turn them ON when alteration of the oscillated frequencies is completed, since a difference in time is generated in the wavelength selecting processes in the AOTFs 1A-1 and 1A-2.

In this case, transmission of optical signals at other wavelengths not selected is prevented at the time of alteration of selected wavelengths so that the wavelength selecting process is performed more accurately.

Incidentally, in the case of a cascade structure of the AOTFs 1A-1 and 1A-2, a plural number of the RF oscillators 2a-1 through 2a-m and the switches 4a-1 through 4a-m may be provided correspondingly to the AOTFs 1A-1 and 1A-2 if the AOTFs 1-1 and 1-2 have different temperature characteristics and are configured as individual modules as described above in (d-2).

(d-4) Description of a Second Modification of the Second Embodiment.

Further, the optical wavelength selective control apparatus 10A shown in FIG. 3 may be provided with an optical switch 5A on the outputting side of the AOTF 1A as indicated by broken line in FIG. 3. The optical switch 5A functions similarly to the above optical switches 5-1 and 5-2, which is controlled by the control unit 3A to be turned OFF to stop an output of the AOTF 1A while the control unit 3A alters oscillation frequencies of the RF oscillators 2a-1 through 2a-m.

In this case, the control unit 3A controls all of the switches 4a-1 through 4a-m to turn them OFF even when altering oscillation frequencies of some of the RF oscillators 2a-1 through 2a-m.

In the optical wavelength selective control apparatus 10A provided with the above optical switch 5A, it is possible to prevent optical signals at wavelengths not selected from being transmitted as optical signals at selected wavelengths more certainly than a case where only the switches 4a-1 through 4a-m are provided.

(d-5) Description of a First Modification of the Third Embodiment.

Figure 7:
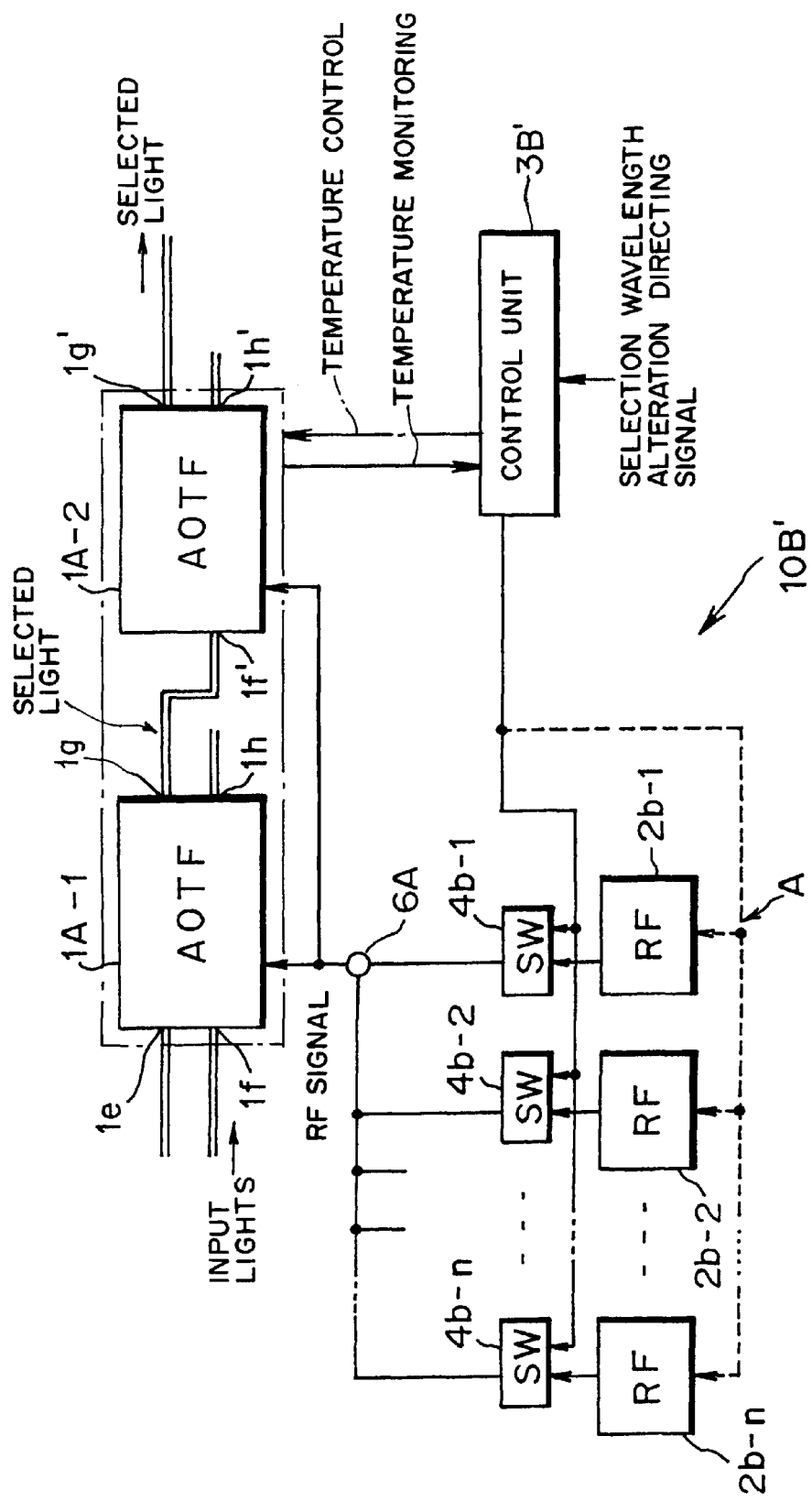
FIG. 7 is a block diagram showing a structure according to a first modification of the third embodiment of this invention.

As shown in FIG. 7, the optical wavelength selective control apparatus 10B (refer to FIG. 5) according to the above third embodiment may be provided with a plurality of AOTFS 1A-1 and 1A-2, for example, connected to one another to form a cascade similarly to those shown in FIG. 1. In this case, the AOTFs 1-1 and 1-2 have the same temperature characteristics and are configured as one module (common module) 1.

Each of the AOTFs 1A-1 and 1A-2 extracts optical signals at arbitrary N wavelengths from WDM signals according to the RF signals from the RF oscillators 2b-1 through 2b-n.

In this case, the control unit 3B' controls all of the switches 4b-1 through 4b-n to turn them OFF to stop outputs of the RF signals from all of the RF oscillators 2b-1 through 2b-n once, then controls only relevant switches 4b-1 through 4b-n to turn them ON in order to supply simultaneously the RF signals corresponding to altered wavelengths to be selected to the AOTFs 1A-1 and 1A-2 even when altering a part of the selected wavelengths, since a difference in time is generated in the wavelength selecting processes in the AOTFs 1A-1 and 1A-2.

The optical wavelength selective control apparatus 10B' shown in FIG. 7 can thereby prevent optical signals at other wavelengths not selected from being transmitted as optical signals at selected wavelengths more certainly than the case shown in FIG. 5. It is therefore possible to further improve accuracy of the wavelength selecting process.

In this case, if the AOTFs 1-1 and 1-2 have different temperature characteristics or are configured as individual modules, a plural number of the RF oscillators 2a-1 through 2a-m and the switches 4a-1 through 4a-m may be provided correspondingly to the AOTFs 1A-1 and 1A-2, as described above in (d-2).

(d-6) Description of a Second Modification of the Third Embodiment.

The optical wavelength selective control apparatus 10B shown in FIG. 5 may be provided with an optical switch 5B on the outputting side of the AOTF 1A as indicated by broken line in FIG. 5.

The optical switch 5B functions substantially similarly to the above optical switches 5-2 and 5A, which is controlled by the control unit 3B to be turned OFF together with all the switches 4b-1 through 4b-n to stop an output of the AOTF 1A while the control unit 3B alters oscillation frequencies of the RF oscillators 2b-1 through 2b-n.

In this case, it is possible to prevent optical signals at other wavelength not selected from being transmitted as optical signals at selected wavelengths more certainly than a case where only the switches 4b-1 through 4b-n are provided. It is therefore possible to further improve accuracy of the wavelength selecting process.

(e) Others

The above embodiments have been described by way of example where the AOTF is used as a wavelength selective optical filter. However, it is possible to employ any other than the AOTF so long as it can select wavelengths of optical signals according to an inputted frequency signal.

When a change in temperature of the AOTF is ignorable, there is unnecessary a fine adjustment on a frequency of the RF signal by temperature monitoring or a temperature control on the AOTF. Further, the above embodiments have been described by way of example where the AOTFS are formed in a two-stage cascade as a multi-stage configuration. However, the AOTFs may be in three or more stages.

Figure 11:
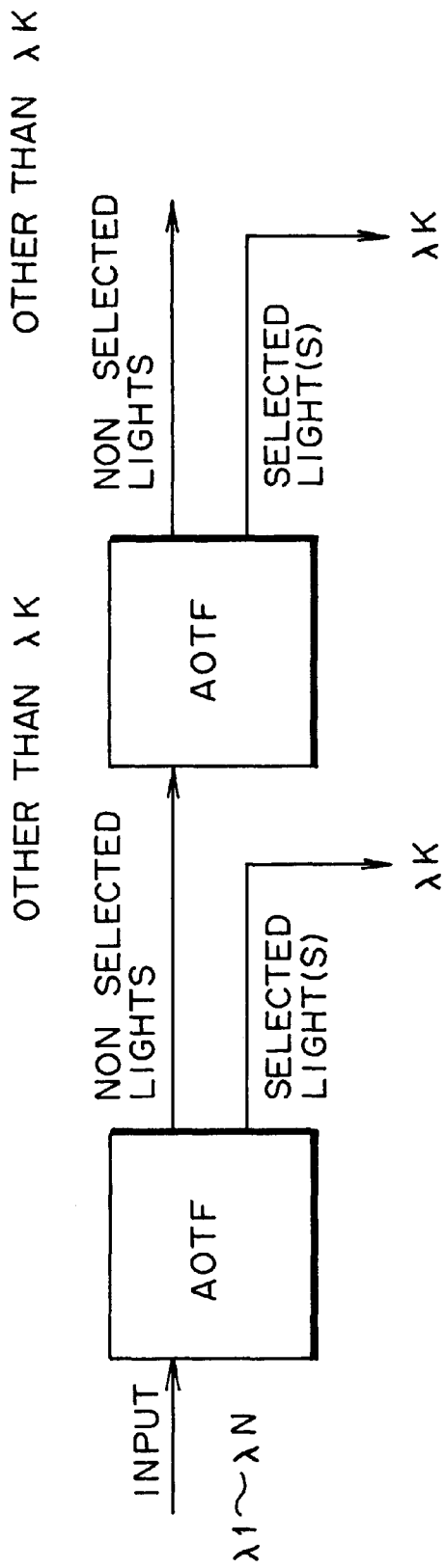
FIG. 11 is a block diagram showing another structure of the optical wavelength selective control apparatus.

The above cascade structure has been described by way of example where an optical signal at a specific wavelength is selected highly accurately in any case. However, it is possible to reject (eliminate) an optical signal at a specific wavelength by reversing a relation between a selected wavelength and a non-selected wavelength (transmitted wavelength), as shown in FIG. 11, for example. In such case, the above optical switch 5-2 cannot be disposed since it is necessary to transmit the non-selected light.

If the above RF oscillators 2, 2a-1 through 2a-m, and 2b-1 through 2b-n are of a voltage controlled type, there is unnecessary to control the switches 4, 4a-1 through 4a-m and 4b-1 through 4b-n (or the amplifier 4') by monitoring a frequency of the RF signal since a relation between oscillation frequencies of the RF oscillators 2, 2a-1 through 2a-m and 2b-1 through 2b-n and an applied voltage is known to the control units 3, 3A and 3B. In such case, it is only necessary to control the switches 4, 4a-1 through 4a-m and 4b-1 through 4b-n (or the amplifier 4') after a predetermined time is elapsed after alteration of an applied voltage.

What is claimed is:

1. An optical wavelength selective control apparatus comprising:
   a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;
   a frequency oscillator for outputting said frequency signal, said frequency signal having a frequency corresponding to the wavelength of the optical signal to be extracted in each of said wavelength selective optical filters;
   a control unit for controlling the frequency of said frequency signal output from said frequency oscillator; and
   a first stopping unit to selectively stop said frequency signal from reaching said wavelength selective optical filters;
      wherein said control unit controls said first stopping unit to stop said frequency signal while said control unit alters the frequency of said frequency signal output from said frequency oscillator,
      said plurality of wavelength selective optical filters have the same temperature characteristics and are configured as a common module, and
      said control unit further controls said frequency oscillator according to a change in temperature of said common module to be able to adjust the frequency of said frequency signal.

2. The optical wavelength selective control apparatus according to claim 1, wherein said first stopping unit is configured as a switch controlled by said control unit to be turned OFF to be able to stop an output of said frequency signal from said frequency oscillator.

3. The optical wavelength selective control apparatus according to claim 1, wherein said first stopping unit is configured as an amplifier being able to stop an output of said frequency signal by adjusting an amplification factor for said frequency signal from said frequency oscillator by said control unit.

4. The optical wavelength selective control apparatus according to claim 1, further comprising:
   a second stopping unit disposed on the outputting side of at least a corresponding optical wavelength selective optical filter to be able to stop an output of an optical signal extracted by said wavelength selective optical filter;
   wherein said control unit controls said second stopping unit to stop the output of said optical signal extracted by said wavelength selective optical filter while said control unit alters a frequency of said frequency signal outputted from said frequency oscillator.

5. The optical wavelength selective control apparatus according to claim 1, wherein each of said wavelength selective optical filters is configured with an acousto-optic tunable filter.

6. An optical wavelength selective control apparatus comprising:
   a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;
   a frequency oscillator for outputting said frequency signal, said frequency signal having a frequency corresponding to the wavelength of the optical signal to be extracted in each of said wavelength selective optical filters;
   a control unit for controlling the frequency of said frequency signal output from said frequency oscillator; and
   a first stopping unit to selectively stop said frequency signal from reaching said wavelength selective optical filters;
      wherein said control unit controls said first stopping unit to stop said frequency signal while said control unit alters the frequency of said frequency signal output from said frequency oscillator, said control unit controls said first stopping unit to stop said frequency signal while said control unit alters the frequency of said frequency signal output from said frequency oscillator, said plurality of wavelength selective optical filters have different temperature characteristics and are configured as one common module, a plural number of said frequency oscillators and said first stopping units are provided corresponding to said plurality of wavelength selective optical filters, and said control unit further controls each of said first stopping units and controls each of said frequency oscillators according to a change in temperature of said common module and the temperature characteristics of each of said wavelength selective optical filters to adjust the frequency of each frequency signal.

7. The optical wavelength selective control apparatus according to claim 6, wherein said first stopping unit is configured as a switch controlled by said control unit to be turned OFF to be able to stop an output of said frequency signal from said frequency oscillator.

8. The optical wavelength selective control apparatus according to claim 6, wherein said first stopping unit is configured as an amplifier being able to stop an output of said frequency signal by adjusting an amplification factor for said frequency signal from said frequency oscillator by said control unit.

9. The optical wavelength selective control apparatus according to claim 6 further comprising:

a second stopping unit disposed on the outputting side of at least a corresponding optical wavelength selective optical filter to be able to stop an output of an optical signal extracted by said wavelength selective optical filter;

wherein said control unit controls said second stopping unit to stop the output of said optical signal extracted by said wavelength selective optical filter while said control unit alters a frequency of said frequency signal outputted from said frequency oscillator.

10. The optical wavelength selective control apparatus according to claim 6, wherein each of said wavelength selective optical filters is configured with an acousto-optic tunable filter.

11. An optical wavelength selective control apparatus comprising:

a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;

a frequency oscillator for outputting said frequency signal, said frequency signal having a frequency corresponding to the wavelength of the optical signal to be extracted in each of said wavelength selective optical filters;

a control unit for controlling the frequency of said frequency signal output from said frequency oscillator; and a first stopping unit to selectively stop said frequency signal from reaching said wavelength selective optical filters; wherein said control unit controls said first stopping unit to stop said frequency signal while said control unit alters the frequency of said frequency signal output from said frequency oscillator, said plurality of wavelength selective optical filters are configured as individual modules, and a plural number of said frequency oscillators and said first stopping units are provided correspondingly to said plurality of wavelength selective optical filters, and said control unit further controls each of said first stopping units and controls each of said frequency oscillators according to a change in temperature of each of said individual modules to adjust the frequency of each frequency signal.

12. The optical wavelength selective control apparatus according to claim 11, wherein said first stopping unit is configured as a switch controlled by said control unit to be turned OFF to be able to stop an output of said frequency signal from said frequency oscillator.

13. The optical wavelength selective control apparatus according to claim 11, wherein said first stopping unit is configured as an amplifier being able to stop an output of said frequency signal by adjusting an amplification factor for said frequency signal from said frequency oscillator by said control unit.

14. The optical wavelength selective control apparatus according to claim 11 further comprising:

a second stopping unit disposed on the outputting side of at least a corresponding optical wavelength selective optical filter to be able to stop an output of an optical signal extracted by said wavelength selective optical filter;

wherein said control unit controls said second stopping unit to stop the output of said optical signal extracted by said wavelength selective optical filter while said control unit alters a frequency of said frequency signal outputted from said frequency oscillator.

15. The optical wavelength selective control apparatus according to claim 11, wherein each of said wavelength selective optical filters is configured with an acousto-optic tunable filter.

16. An optical wavelength selective control apparatus comprising:

a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;

a frequency oscillator for outputting said frequency signal, said frequency signal having a frequency corresponding to the wavelength of the optical signal to be extracted in each of said wavelength selective optical filters;

a control unit for controlling the frequency of said frequency signal output from said frequency oscillator; and a first stopping unit to selectively stop said frequency signal from reaching said wavelength selective optical filters; wherein said control unit controls said first stopping unit to stop said frequency signal while said control unit alters the frequency of said frequency signal output from said frequency oscillator, said plurality of wavelength selective optical filters individually have the same temperature characteristics and are configured as a common module, and said control unit further controls the temperature, of said common module such that the temperature of said common module is a predetermined temperature, and then controls the frequency generated by said frequency oscillator, so as to adjust the frequency of the frequency signal supplied to said plurality of wavelength selective optical filters.

17. The optical wavelength selective control apparatus according to claim 16, wherein said first stopping unit is configured as a switch controlled by said control unit to be turned OFF to be able to stop an output of said frequency signal from said frequency oscillator.

18. The optical wavelength selective control apparatus according to claim 16, wherein said first stopping unit is configured as an amplifier being able to stop an output of said frequency signal by adjusting an amplification factor for said frequency signal from said frequency oscillator by said control unit.

19. The optical wavelength selective control apparatus according to claim 16 further comprising:
a second stopping unit disposed on the outputting side of at least a corresponding optical wavelength selective optical filter to be able to stop an output of an optical signal extracted by said wavelength selective optical filter;
wherein said control unit controls said second stopping unit to stop the output of said optical signal extracted by said wavelength selective optical filter while said control unit alters a frequency of said frequency signal outputted from said frequency oscillator.

20. The optical wavelength selective control apparatus according to claim 16, wherein each of said wavelength selective optical filters is configured with an acousto-optic tunable filter.

21. An optical wavelength selective control apparatus comprising:
a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;
a frequency oscillator for outputting said frequency signal, said frequency signal having a frequency corresponding to the wavelength of the optical signal to be extracted in each of said wavelength selective optical filters;
a control unit for controlling the frequency of said frequency signal output from said frequency oscillator; and
a first stopping unit to selectively stop said frequency signal from reaching said wavelength selective optical filters; wherein
said control unit controls said first stopping unit to stop said frequency signal while said control unit alters the frequency of said frequency signal output from said frequency oscillator,
said plurality of wavelength selective optical filters have different temperature characteristics and are configured as one common module, and a plural number of said frequency oscillators and said first stopping units are provided corresponding to said plurality of wavelength selective optical filters, and
said control unit controls each of said first stopping units, controls a temperature of said common module so that the temperature of said common module is a predetermined temperature, and controls each of said frequency oscillators according to the temperature characteristics of each of said wavelength selective optical filters to adjust the frequency of each frequency signal.

22. The optical wavelength selective control apparatus according to claim 21, wherein said first stopping unit is configured as a switch controlled by said control unit to be turned OFF to be able to stop an output of said frequency signal from said frequency oscillator.

23. The optical wavelength selective control apparatus according to claim 21, wherein said first stopping unit is configured as an amplifier being able to stop an output of said frequency signal by adjusting an amplification factor for said frequency signal from said frequency oscillator by said control unit.

24. The optical wavelength selective control apparatus according to claim 21 further comprising:
a second stopping unit disposed on the outputting side of at least a corresponding optical wavelength selective optical filter to be able to stop an output of an optical signal extracted by said wavelength selective optical filter;
wherein said control unit controls said second stopping unit to stop the output of said optical signal extracted by said wavelength selective optical filter while said control unit alters a frequency of said frequency signal outputted from said frequency oscillator.

25. The optical wavelength selective control apparatus according to claim 21, wherein each of said wavelength selective optical filters is configured with an acousto-optic tunable filter.

26. An optical wavelength selective control apparatus comprising:
a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;
a frequency oscillator for outputting said frequency signal, said frequency signal having a frequency corresponding to the wavelength of the optical signal to be extracted in each of said wavelength selective optical filters;
a control unit for controlling the frequency of said frequency signal output from said frequency oscillator; and
a first stopping unit to selectively stop said frequency signal from reaching said wavelength selective optical filters; wherein
said control unit controls said first stopping unit to stop said frequency signal while said control unit alters the frequency of said frequency signal output from said frequency oscillator,
said plurality of wavelength selective optical filters individually have different temperature characteristics and are configured as individual modules,
said control unit controls the temperature of each of said individual modules so that a temperature of each of said individual modules is a predetermined temperature, and then controls said frequency oscillator, so as to adjust the frequency of the frequency signal to be supplied to said plurality of
wavelength selective optical filters.

27. The optical wavelength selective control apparatus according to claim 26, wherein said first stopping unit is configured as a switch controlled by said control unit to be turned OFF to be able to stop an output of said frequency signal from said frequency oscillator.

28. The optical wavelength selective control apparatus according to claim 26, wherein said first stopping unit is configured as an amplifier being able to stop an output of said frequency signal by adjusting an amplification factor for said frequency signal from said frequency oscillator by said control unit.

29. The optical wavelength selective control apparatus according to claim 26 further comprising:
   a second stopping unit disposed on the outputting side of at least a corresponding optical wavelength selective optical filter to be able to stop an output of an optical signal extracted by said wavelength selective optical filter;
   wherein said control unit controls said second stopping unit to stop the output of said optical signal extracted by said wavelength selective optical filter while said control unit alters a frequency of said frequency signal outputted from said frequency oscillator.

30. The optical wavelength selective control apparatus according to claim 26, wherein each of said wavelength selective optical filters is configured with an acousto-optic tunable filter.

31. An optical wavelength selective control apparatus comprising:
   a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;
   m frequency oscillators for outputting frequency signals at frequencies corresponding to the wavelengths of the optical signals to be extracted in said wavelength selecting unit;
   a control unit for controlling each of the frequencies of said frequency signals output from said frequency oscillators; and
   m stopping units each to selectively stop one of said frequency signals from reaching the wavelength selecting unit; wherein
      said control unit controls each of said stopping units to stop said frequency signal while said control unit alters the frequency of said frequency signal output from the corresponding frequency oscillator,
      said control unit controls said frequency oscillators according to a change in temperature of said wavelength selecting unit to be able to adjust the frequencies of said frequency signals.

32. An optical wavelength selective control apparatus comprising:
   a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;
   m frequency oscillators for outputting frequency signals at frequencies corresponding to the wavelengths of the optical signals to be extracted in said wavelength selecting unit;
   a control unit for controlling each of the frequencies of said frequency signals output from said frequency oscillators; and
   m stopping units each to selectively stop one of said frequency signals from reaching the wavelength selecting unit; wherein
      said control unit controls each of said stopping units to stop said frequency signal while said control unit alters the frequency of said frequency signal output from the corresponding frequency oscillator,
      said wavelength selecting unit has a plurality of wavelength selective optical filters each for extracting an optical signal at an arbitrary wavelength from said wavelength division multiplexed signal according to a frequency signal,
      said wavelength selective optical filters are connected to one another to form a cascade,
      said plurality of wavelength selective optical filters have the same temperature characteristics and are configured as a common module, and
      said control unit controls said frequency oscillator according to a change in temperature of said common module to be able to adjust a frequency of said frequency signal.

33. The optical wavelength selective control apparatus according to claim 32, wherein said wavelength selective optical filter is configured with an acousto-optic tunable filter.

34. An optical wavelength selective control apparatus comprising:
   a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;
   m frequency oscillators for outputting frequency signals at frequencies corresponding to the wavelengths of the optical signals to be extracted in said wavelength selecting unit;
   a control unit for controlling each of the frequencies of said frequency signals output from said frequency oscillators; and
   m stopping units each to selectively stop one of said frequency signals from reaching the wavelength selecting unit; wherein
      said control unit controls each of said stopping units to stop said frequency signal while said control unit alters the frequency of said frequency signal output from the corresponding frequency oscillator,
      said wavelength selecting unit has a plurality of wavelength selective optical filters each for extracting optical signals at arbitrary m wavelengths from said wavelength division multiplexed signals according to said frequency signals from said m frequency oscillators, said wavelength selective optical filters are connected to one another to form a cascade, said plurality of wavelength selective optical filters have different temperature characteristics and are configured as one common module, a plural number of said frequency oscillators and said stopping units are provided correspondingly to said plurality of wavelength selective optical filters, and said control unit further controls each of said stopping units and controls each of said frequency oscillators according to a change in temperature of said common module and the temperature characteristics of each of said wavelength selective optical filters to adjust a frequency of each frequency signal.

35. The optical wavelength selective control apparatus according to claim 34, wherein said wavelength selective optical filter is configured with an acousto-optic tunable filter.

36. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

m frequency oscillators for outputting frequency signals at frequencies corresponding to the wavelengths of the optical signals to be extracted in said wavelength selecting unit;

a control unit for controlling each of the frequencies of said frequency signals output from said frequency oscillators; and m stopping units each to selectively stop one of said frequency signals from reaching the wavelength selecting unit; wherein said control unit controls each of said stopping units to stop said frequency signal while said control unit alters the frequency of said frequency signal output from the corresponding frequency oscillator, said wavelength selecting unit has a plurality of wavelength selective optical filters each for extracting optical signals at arbitrary m wavelengths from said wavelength division multiplexed signals according to said frequency signals from said m frequency oscillators, said wavelength selective optical filters are connected to one another to form a cascade, said plurality of wavelength selective optical filters are configured as individual modules, and a plural number of said frequency oscillators and said stopping units are provided correspondingly to said plurality of wavelength selective optical filters, and said control unit controls each of said stopping units and controls each of said frequency oscillators according to a change in temperature of each of said individual modules to adjust a frequency of each frequency signal.

37. The optical wavelength selective control apparatus according to claim 36, wherein said wavelength selective optical filter is configured with an acousto-optic tunable filter.

38. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

m frequency oscillators for outputting frequency signals at frequencies corresponding to the wavelengths of the optical signals to be extracted in said wavelength selecting unit;

a control unit for controlling each of the frequencies of said frequency signals output from said frequency oscillators; and m stopping units each to selectively stop one of said frequency signals from reaching the wavelength selecting unit; wherein said control unit controls each of said stopping units to stop said frequency signal while said control unit alters the frequency of said frequency signal output from the corresponding frequency oscillator, said wavelength selecting unit has a plurality of wavelength selective optical filters each for extracting optical signals at arbitrary m wavelengths from said wavelength division multiplexed signals according to said frequency signals from said m frequency oscillators, said wavelength selective optical filters are connected to one another to form a cascade, said plurality of wavelength selective optical filters individually have the same temperature characteristics and are configured as a common module, and said control unit controls a temperature of said common module such that a temperature of said common module is a predetermined temperature, and further controls said frequency oscillator, so as to adjust the frequency of the frequency signal to be supplied to said plurality of wavelength selective optical filters.

39. The optical wavelength selective control apparatus according to claim 38, wherein said wavelength selective optical filter is configured with an acousto-optic tunable filter.

40. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

m frequency oscillators for outputting frequency signals at frequencies corresponding to the wavelengths of the optical signals to be extracted in said wavelength selecting unit;

a control unit for controlling each of the frequencies of said frequency signals output from said frequency oscillators; and m stopping units each to selectively stop one of said frequency signals from reaching the wavelength selecting unit; wherein
said control unit controls each of said stopping units to stop said frequency signal while said control unit alters the frequency of said frequency signal output from the corresponding frequency oscillator,
said wavelength selecting unit has a plurality of wavelength selective optical filters each for extracting optical signals at arbitrary m wavelengths from said wavelength division multiplexed signals according to said frequency signals from said m frequency oscillators, said wavelength selective optical filters are connected to one another to form a cascade,
said plurality of wavelength selective optical filters have different temperature characteristics and are configured as one common module, and a plural number of said frequency oscillators and said stopping units are provided correspondingly to said plurality of wavelength selective optical filters, and
said control unit controls each of said stopping units, controls a temperature of said common module so that a temperature of said common module is a predetermined temperature, and controls each of said frequency oscillators according to the temperature characteristics of each of said wavelength selective optical filters to adjust a frequency of each frequency signal.

41. The optical wavelength selective control apparatus according to claim 40, wherein said wavelength selective optical filter is configured with an acousto-optic tunable filter.

42. An optical wavelength selective control apparatus comprising:
a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;
m frequency oscillators for outputting frequency signals at frequencies corresponding to the wavelengths of the optical signals to be extracted in said wavelength selecting unit;
a control unit for controlling each of the frequencies of said frequency signals output from said frequency oscillators; and
m stopping units each to selectively stop one of said frequency signals from reaching the wavelength selecting unit; wherein
said control unit controls each of said stopping units to stop said frequency signal while said control unit alters the frequency of said frequency signal output from the corresponding frequency oscillator,
said wavelength selecting unit has a plurality of wavelength selective optical filters each for extracting optical signals at arbitrary m wavelengths from said wavelength division multiplexed signals according to said frequency signals from said m frequency oscillators,
said wavelength selective optical filters are connected to one another to form a cascade, said plurality of wavelength selective optical filters individually have different temperature characteristics and are configured as individual modules, and
said control unit controls a temperature of each of said individual modules so that a temperature of each of said individual modules is a predetermined temperature, and said frequency oscillator, so as to adjust the frequency of the frequency signal to be supplied to said plurality of wavelength selective optical filters.

43. The optical wavelength selective control apparatus according to claim 42, wherein said wavelength selective optical filter is configured with an acousto-optic tunable filter.

44. An optical wavelength selective control apparatus comprising:
a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;
N frequency oscillators for outputting frequency signals at frequencies corresponding to the wavelengths of the multiplexed optical signals;
N stopping units each to selectively stop one of said frequency signals from reaching the wavelength selecting unit; and
a control unit for controlling the stopping units such that the frequency signals corresponding to the wavelengths of the optical signals targeted for extraction are not stopped and the frequency signals not corresponding to the wavelengths targeted for extraction are stopped; wherein
said control unit controls said frequency oscillators according to a change in temperature of said wavelength selecting unit to adjust the frequencies of said frequency signals.

45. An optical wavelength selective control apparatus comprising:
a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;
N frequency oscillators for outputting frequency signals at frequencies corresponding to the wavelengths of the multiplexed optical signals;
N stopping units each to selectively stop one of said frequency signals from reaching the wavelength selecting unit; and
a control unit for controlling the stopping units such that the frequency signals corresponding to the wavelengths of the optical signals targeted for extraction are not stopped and the frequency signals not corresponding to the wavelengths targeted for extraction are stopped; wherein
said wavelength selecting unit has a plurality of wavelength selective optical filters each for extracting optical signals at arbitrary m wavelengths from said wavelength-division-multiplexed signals according to said frequency signals from m frequency oscillators among said N frequency oscillators, said wavelength selective optical filters are connected to one another to form a cascade, said plurality of wavelength selective optical filters have the same temperature characteristics and are configured as a common module, and said control unit controls said frequency oscillator according to a change in temperature of said common module to be able to adjust a frequency of said frequency signal.

46. The optical wavelength selective control apparatus according to claim 45, wherein said wavelength selective optical filter is configured with an acousto-optic tunable filter.

47. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

N frequency oscillators for outputting frequency signals at frequencies corresponding to the wavelengths of the multiplexed optical signals;

N stopping units each to selectively stop one of said frequency signals from reaching the wavelength selecting unit; and a control unit for controlling the stopping units such that the frequency signals corresponding to the wavelengths of the optical signals targeted for extraction are not stopped and the frequency signals not corresponding to the wavelengths targeted for extraction are stopped; wherein said wavelength selecting unit has a plurality of wavelength selective optical filters each for extracting optical signals at arbitrary m wavelengths from said wavelength-division-multiplexed signals according to said frequency signals from m frequency oscillators among said N frequency oscillators, said wavelength selective optical filters are connected to one another to form a cascade, said plurality of wavelength selective optical filters have different temperature characteristics and are configured as one common module, a plural number of said frequency oscillators and said stopping units are provided correspondingly to said plurality of wavelength selective optical filters; and said control unit controls each of said stopping units and controls each of said frequency oscillators according to a change in temperature of said common module and the temperature characteristics of each of said wavelength selective optical filters to adjust a frequency of each frequency signal.

48. The optical wavelength selective control apparatus according to claim 47, wherein said wavelength selective optical filter is configured with an acousto-optic tunable filter.

49. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

N frequency oscillators for outputting frequency signals at frequencies corresponding to the wavelengths of the multiplexed optical signals;

N stopping units each to selectively stop one of said frequency signals from reaching the wavelength selecting unit; and a control unit for controlling the stopping units such that the frequency signals corresponding to the wavelengths of the optical signals targeted for extraction are not stopped and the frequency signals not corresponding to the wavelengths targeted for extraction are stopped; wherein said wavelength selecting unit has a plurality of wavelength selective optical filters each for extracting optical signals at arbitrary m wavelengths from said wavelength-division-multiplexed signals according to said frequency signals from m frequency oscillators among said N frequency oscillators, said wavelength selective optical filters are connected to one another to form a cascade, said plurality of wavelength selective optical filters are configured as individual modules, and a plural number of said frequency oscillators and said stopping units are provided correspondingly to said plurality of wavelength selective optical filters, and said control unit controls each of said stopping units and controls each of said frequency oscillators according to a change in temperature of each of said individual modules to adjust a frequency of each frequency signal.

50. The optical wavelength selective control apparatus according to claim 49, wherein said wavelength selective optical filter is configured with an acousto-optic tunable filter.

51. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

N frequency oscillators for outputting frequency signals at frequencies corresponding to the wavelengths of the multiplexed optical signals;

N stopping units each to selectively stop one of said frequency signals from reaching the wavelength selecting unit; and a control unit for controlling the stopping units such that the frequency signals corresponding to the wavelengths of the optical signals targeted for extraction are not stopped and the frequency signals not corresponding to the wavelengths targeted for extraction are stopped; wherein said wavelength selecting unit has a plurality of wavelength selective optical filters each for extracting optical signals at arbitrary m wavelengths from said wavelength-division-multiplexed signals according to said frequency signals from m frequency oscillators among said N frequency oscillators, said wavelength selective optical filters are connected to one another to form a cascade, and said plurality of wavelength selective optical filters individually have the same temperature characteristics and are configured as a common module, and said control unit controls a temperature of said common module such that a temperature of said common module is a predetermined temperature, and further controls said frequency oscillator, so as to adjust the frequency of the frequency signal to be supplied to said plurality of wavelength selective optical filters.

52. The optical wavelength selective control apparatus according to claim 51, wherein said wavelength selective optical filter is configured with an acousto-optic tunable filter.

53. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

N frequency oscillators for outputting frequency signals at frequencies corresponding to the wavelengths of the multiplexed optical signals;

N stopping units each to selectively stop one of said frequency signals from reaching the wavelength selecting unit; and a control unit for controlling the stopping units such that the frequency signals corresponding to the wavelengths of the optical signals targeted for extraction are not stopped and the frequency signals not corresponding to the wavelengths targeted for extraction are stopped; wherein said wavelength selecting unit has a plurality of wavelength selective optical filters each for extracting optical signals at arbitrary m wavelengths from said wavelength-division-multiplexed signals according to said frequency signals from m frequency oscillators among said N frequency oscillators, said wavelength selective optical filters are connected to one another to form a cascade, said plurality of wavelength selective optical filters have different temperature characteristics and are configured as one common module, and a plural number of said frequency oscillators and said stopping units are provided correspondingly to said plurality of wavelength selective optical filters, and said control unit controls each of said stopping units, controls a temperature of said common module so that a temperature of said common module is a predetermined temperature, and controls each of said frequency oscillators according to the temperature characteristics of each of said wavelength selective optical filters to adjust a frequency of each frequency signal.

54. The optical wavelength selective control apparatus according to claim 53, wherein said wavelength selective optical filter is configured with an acousto-optic tunable filter.

55. An optical wavelength selective control apparatus comprising:

a wavelength selecting unit for extracting a maximum of m optical signals from a wavelength-division-multiplexed signal, according to frequency signals, the wavelength-division-multiplexed signal being formed by wavelength-division-multiplexing N optical signals, where m and N are natural numbers satisfying the relationship 1<m<N and where N is not less than 2, each of the optical signals being extracted and each of the multiplexed optical signals having a corresponding wavelength;

N frequency oscillators for outputting frequency signals at frequencies corresponding to the wavelengths of the multiplexed optical signals;

N stopping units each to selectively stop one of said frequency signals from reaching the wavelength selecting unit; and a control unit for controlling the stopping units such that the frequency signals corresponding to the wavelengths of the optical signals targeted for extraction are not stopped and the frequency signals not corresponding to the wavelengths targeted for extraction are stopped; wherein said wavelength selecting unit has a plurality of wavelength selective optical filters each for extracting optical signals at arbitrary m wavelengths from said wavelength-division-multiplexed signals according to said frequency signals from m frequency oscillators among said N frequency oscillators;

said wavelength selective optical filters are connected to one another to form a cascade, said plurality of wavelength selective optical filters individually have different temperature characteristics and are configured as individual modules, and said control unit controls a temperature, of each of said individual modules so as to avoid miss extraction of the optical signal cause of the difference of the temperature characteristics between said individual modules, and said frequency oscillator, so as to adjust the frequency of the frequency signal to be supplied to said plurality of wavelength selective optical filters.

56. The optical wavelength selective control apparatus according to claim 55, wherein said wavelength selective optical filter is configured with an acousto-optic tunable filter.

57. An optical wavelength selective control apparatus comprising:

a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;

a frequency oscillator for outputting said frequency signal, said frequency signal having a frequency corresponding to the wavelength of the optical signal to be extracted in each of said wavelength selective optical filters;

a control unit for controlling the frequency of said frequency signal output from said frequency oscillator; and a first stopping unit to selectively stop said frequency signal from reaching said wavelength selective optical filters; wherein said control unit controls said first stopping unit to stop said frequency signal while said control unit alters the frequency of said frequency signal output from said frequency oscillator, said plurality of wavelength selective optical filters individually have the same temperature characteristics and are configured as a common module, and said control unit further controls the temperature, of said common module-such that the temperature of said common module is a predetermined temperature.

58. An optical wavelength selective control apparatus comprising:

a plurality of wavelength selective optical filters each for extracting an optical signal at a wavelength, according to a frequency signal, the optical signal being extracted from a wavelength-division-multiplexed optical signal formed by wavelength-division-multiplexing optical signals at a plurality of wavelengths, said wavelength selecting optical filters being connected to one another to form a cascade;

a frequency oscillator for outputting said frequency signal, said frequency signal having a frequency corresponding to the wavelength of the optical signal to be extracted in each of said wavelength selective optical filters;

a control unit for controlling the frequency of said frequency signal output from said frequency oscillator; and a first stopping unit to selectively stop said frequency signal from reaching said wavelength selective optical filters; wherein said control unit controls said first stopping unit to stop said frequency signal while said control unit alters the frequency of said frequency signal output from said frequency oscillator, said plurality of wavelength selective optical filters individually have different temperature characteristics and are configured as individual modules, said control unit controls the temperature of each of said individual modules so that a temperature of each of said individual modules is a predetermined temperature.

* * * * *